US011599336B2

(12) United States Patent
Jain

(10) Patent No.: US 11,599,336 B2
(45) Date of Patent: Mar. 7, 2023

(54) GENERATING AND UPDATING VOICE-BASED SOFTWARE APPLICATIONS USING APPLICATION TEMPLATES

(71) Applicant: Google LLC, Mountain View, CA (US)

(72) Inventor: Tarun Jain, Los Altos, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/547,596

(22) Filed: Dec. 10, 2021

(65) Prior Publication Data

US 2022/0100476 A1 Mar. 31, 2022

Related U.S. Application Data

(63) Continuation of application No. 16/866,985, filed on May 5, 2020, now Pat. No. 11,221,830.

(60) Provisional application No. 62/843,920, filed on May 6, 2019.

(51) Int. Cl.
| | |
|---|---|
| *G06F 9/44* | (2018.01) |
| *G06F 8/33* | (2018.01) |
| *G06F 3/0482* | (2013.01) |
| *G10L 15/18* | (2013.01) |
| *G10L 15/22* | (2006.01) |
| *G10L 15/28* | (2013.01) |
| *H04N 21/2387* | (2011.01) |
| *H04N 21/458* | (2011.01) |
| *G10L 15/08* | (2006.01) |

(52) U.S. Cl.
CPC .............. *G06F 8/33* (2013.01); *G06F 3/0482* (2013.01); *G10L 15/1815* (2013.01); *G10L 15/1822* (2013.01); *G10L 15/22* (2013.01);

*G10L 15/28* (2013.01); *H04N 21/2387* (2013.01); *H04N 21/4586* (2013.01); *G10L 2015/088* (2013.01); *G10L 2015/223* (2013.01)

(58) Field of Classification Search
CPC ......................................................... G06F 9/44
See application file for complete search history.

(56) References Cited

U.S. PATENT DOCUMENTS

| | | | | |
|---|---|---|---|---|
| 6,052,367 A | * | 4/2000 | Bowater | ............... H04M 3/533 370/352 |
| 2004/0010412 A1 | | 1/2004 | Chiu | |
| 2014/0379338 A1 | * | 12/2014 | Fry | ......................... G10L 15/32 704/246 |

(Continued)

*Primary Examiner* — Jae U Jeon
(74) *Attorney, Agent, or Firm* — Dority & Manning, P.A.

(57) ABSTRACT

Systems and methods of generating voice-based software applications are provided. A system can receive, from an application developer computing device, a request to build a voice-based software application. The system can select an application template from a plurality of application templates. The selected application template can include a module that corresponds to a function of the voice-based software application. The system can provide the selected application template to the application developer computing device. The system can receive, from the application developer computing device, an input for a field of the at least one module of the selected application template. The system can generate the voice-based software application based on the selected application template and the input for the at least one field of the at least one module of the selected application template.

20 Claims, 5 Drawing Sheets

(56) References Cited

U.S. PATENT DOCUMENTS

2019/0116225 A1* 4/2019 Zhang .................. H04L 67/025
2020/0098354 A1 3/2020 Lin et al.

* cited by examiner

GENERATING AND UPDATING VOICE-BASED SOFTWARE APPLICATIONS USING APPLICATION TEMPLATES

CROSS-REFERENCES TO RELATED APPLICATIONS

This application is a continuation of U.S. application Ser. No. 16/866,985 having a filing date of May 5, 2020, which claims the benefit of priority under 35 U.S.C. § 119 to U.S. Provisional Patent Application No. 62/843,920, filed May 6, 2019. Applicant claims priority to and the benefit of each of such applications and incorporate all such applications herein by reference in its entirety.

BACKGROUND

Applications can be installed on a computing device. The computing device can execute the applications.

SUMMARY

This disclosure is generally directed to generating and updating voice-based software applications using application templates. An application developer may want to produce an application having a voice-based component. Such an application may be used by an end user to perform a wide range of functions, which may relate to one or more services provided by the application developer. It may be challenging for the application developer to create the application in an efficient manner and in a format that presents the end user with information and controls to perform the functions associated with the application. For example, the application developer may be required to write or otherwise generate low-level computer instructions or code corresponding to the application, which can be a time consuming and error-prone process. The systems and methods of this disclosure can select an application template for the application developer based on the desired functions of the application. The application template can include one or more modules each corresponding to a particular function of the application. The application developer can provide inputs corresponding to blank fields for at least one module of the application template, and a data processing system can generate the application in an automated fashion based on the inputs received from the application developer. For example, the data processing system can maintain standardized or reusable code corresponding to the modules, along with placeholders or blank fields that can be populated with customizable code to customize the functionality of the module for the application developer. The data processing system can use the inputs provided by the application developer corresponding to the blank fields to populate the customizable code and automatically generate the application. In addition, when an update to the standardized or reusable code of a module becomes available, the data processing system can automatically update the application based on the updated code and the inputs previously provided by the application developer. Thus, the data processing system can automatically update the application without any additional input or action from the application developer. As a result, the data processing system can allow software applications to be developed more efficiently and updated automatically.

At least one aspect is directed to a system to generate voice-based software applications. The system can include a data processing system including at least one processor and memory. The data processing system can receive, from an application developer computing device, a request to build a voice-based software application. The data processing system can select, based on a policy and the request, an application template from a plurality of application templates. The selected application template can include at least one module that corresponds to a function of the voice-based software application and has at least one field. The data processing system can provide the selected application template to the application developer computing device to cause the selected application template to be displayed on the application developer computing device. The data processing system can receive, from the application developer computing device, an input for the at least one field of the at least one module of the selected application template. The data processing system can generate the voice-based software application based on the selected application template and the input for the at least one field of the at least one module of the selected application template to allow the voice-based software application to i) present a digital component selected based on a keyword match, and ii) perform, responsive to voice input, the function that corresponds to the at least one module of the selected application template. The data processing system can detect an updated function including a change to the function that corresponds to the at least one module of the selected application template. The change to the function can be provided by an administrator computing device of the data processing system different from the application developer computing device. The data processing system can update, responsive to detection of the updated function, the voice-based software application to allow the voice-based software application to perform the updated function.

In some implementations, the data processing system can parse the request to determine a type of the voice-based software application. The data processing system can select the application template based on the type.

The data processing system can select the application template comprising a slot for presenting the digital component provided by a third-party digital component provider. The data processing system can receive second input from the application developer computing device comprising selection criteria used to select, via a real-time content selection process, the digital component for presentation via the slot.

The data processing system can select the application template comprising a slot for presenting the digital component provided by a third-party digital component provider. The data processing system can receive, from the application developer computing device, a maximum time duration for the slot. The data processing system can generate the voice-based software application with the slot for the digital component with the maximum time duration.

The data processing system can select the application template comprising a slot for presenting the digital component provided by a third-party digital component provider. The data processing system can receive an indication from the application developer computing device to establish the slot the digital component as an audio-only slot. The data processing system can generate the voice-based software application with the audio-only slot.

The data processing system can select the application template comprising a slot for presenting the digital component provided by a third-party digital component provider. The data processing system can receive an indication from the application developer computing device to configure the slot as a cross-device slot in which the digital component is provided on a second computing device different from a first computing device presenting the voice-based software application. The data processing system can generate the voice-based software application with the cross-device slot.

In some implementations, the data processing system can parse the request to determine a type of the voice-based software application. The data processing system can select the application template based on the type. The data processing system can provide, to the application developer computing device, a list of application types to cause the list to be displayed on the application developer computing device. The data processing system can receive, from the application developer computing device, a selection of a first type of the plurality of types. The data processing system can select the application template based on the type. The data processing system can determine a type of the voice-based software application. The data processing system can identify a second module not included in the selected application template. The second module can correspond to a second function of the voice-based software application. The data processing system can modify the selected to application template to generate a modified application template. The data processing system can provide the modified application template to the application developer computing device to cause the modified application template to be displayed on the application developer computing device. The data processing system can determine a type of the voice-based software application. The data processing system can identify a second voice-based software application having the same type. The data processing system can select the application template based on a second function of the second voice-based software application. The data processing system can parse the request to determine an intent. The data processing system can identify a plurality of modules associated with the intent. The data processing system can select the application template based on an overlap between the identified plurality of modules associated with the intent and the at least one module of the selected application template. The data processing system can receive the request indicating that the voice-based application includes a video function. The data processing system can select the application template to include a video module to support the video function. The data processing system can receive the request indicating that the voice-based application includes a video function. The data processing system can select the application template to include a video module to support the video function. The video module may correspond to at least one of a pause function, a play function, a rewind function, and a forward function. The data processing system can receive the request indicating that the voice-based application includes a video function. The data processing system can select the application template to include a video module to support the video function. The video module corresponding to at least one of a pause function, a play function, a rewind function, or a forward function. The data processing system can detect the updated function corresponding to a change in a graphical user interface element for the at least one of the pause function, the play function, the rewind function, or the forward function. The data processing system can provide, to the application developer computing device, a web-based graphical user interface within which the selected application template is displayed. The data processing system can provide, to the application developer computing device, a software development application that is executed by the developer computing device. The software development application may include a graphical user interface within which the selected application template is displayed.

At least one aspect is directed to a method of generating voice-based software applications. The method can include receiving, by a data processing system including at least one processor and memory, from an application developer computing device, a request to build a voice-based software application. The method can include selecting, by the data processing system based on a policy and the request, an application template from a plurality of application templates. The selected application template can include at least one module that corresponds to a function of the voice-based software application and having at least one field. The method can include providing, by the data processing system, the selected application template to the application developer computing device to cause the selected application template to be displayed on the application developer computing device. The method can include receiving, by the data processing system from the application developer computing device, an input for the at least one field of the at least one module of the selected application template. The method can include generating, by the data processing system, the voice-based software application based on the selected application template and the input for the at least one field of the at least one module of the selected application template to allow the voice-based software application to i) present a digital component selected based on a keyword match, and ii) perform, responsive to voice input, the function that corresponds to the at least one module of the selected application template. The method can include detecting, by the data processing system, an updated function including a change to the function that corresponds to the at least one module of the selected application template. the change to the function can be provided by an administrator computing device of the data processing system different from the application developer computing device. The method can include updating, by the data processing system responsive to detection of the updated function, the voice-based software application to allow the voice-based software application to perform the updated function.

In some implementations, the method can include the data processing system selecting the application template comprising a slot for presenting the digital component provided by a third-party digital component provider. The method can include the data processing system receiving second input from the application developer computing device comprising selection criteria used to select, via a real-time content selection process, the digital component for presentation via the slot.

The method can include the data processing system selecting the application template comprising a slot for presenting the digital component provided by a third-party digital component provider. The method can include the data processing system receiving, from the application developer computing device, a maximum time duration for the slot. The method can include the data processing system generating the voice-based software application with the slot for the digital component with the maximum time duration.

The method can include the data processing system selecting the application template comprising a slot for presenting the digital component provided by a third-party digital component provider. The method can include the data processing system receiving an indication from the application developer computing device to establish the slot the digital component as an audio-only slot. The method can include the data processing system generating the voice-based software application with the audio-only slot.

The method can include the data processing system selecting the application template comprising a slot for presenting the digital component provided by a third-party digital component provider. The method can include the data processing system receiving an indication from the application developer computing device to configure the slot as a cross-device slot in which the digital component is provided on a second computing device different from a first computing device presenting the voice-based software application. The method can include the data processing system generating the voice-based software application with the cross-device slot.

The method can include parsing, by the data processing system, the request to determine a type of the voice-based software application. The method can include selecting, by the data processing system, the application template based on the type. The method can include providing, by the data processing system to the application developer computing device, a list of application types to cause the list to be displayed on the application developer computing device. The method can include receiving, by the data processing system from the application developer computing device, a selection of a first type of the plurality of types. The method can include selecting, by the data processing system, the application template based on the type. The method can include determining, by the data processing system, a type of the voice-based software application. The method can include identifying, by the data processing system, a second module not included in the selected application template. The second module can correspond to a second function of the voice-based software application. The method can include modifying, by the data processing system, the selected to application template to generate a modified application template. The method can include providing, by the data processing system, the modified application template to the application developer computing device to cause the modified application template to be displayed on the application developer computing device. The method can include determining, by the data processing system, a type of the voice-based software application. The method can include identifying, by the data processing system, a second voice-based software application having the same type. The method can include selecting, by the data processing system, the application template based on a second function of the second voice-based software application. The method can include parsing, by the data processing system, the request to determine an intent. The method can include identifying, by the data processing system, a plurality of modules associated with the intent. The method can include selecting, by the data processing system, the application template based on an overlap between the identified plurality of modules associated with the intent and the at least one module of the selected application template. The method can include receiving, by the data processing system, the request indicating that the voice-based application includes a video function. The method can include selecting, by the data processing system, the application template to include a video module to support the video function. The method can include receiving, by the data processing system, the request indicating that the voice-based application includes a video function. The method can include selecting, by the data processing system, the application template to include a video module to support the video function, the video module corresponding to at least one of a pause function, a play function, a rewind function, and a forward function. The method can include receiving, by the data processing system, the request indicating that the voice-based application includes a video function. The method can include selecting, by the data processing system, the application template to include a video module to support the video function. The video module can correspond to at least one of a pause function, a play function, a rewind function, or a forward function. The method can include detecting, by the data processing system, the updated function corresponding to a change in a graphical user interface element for the at least one of the pause function, the play function, the rewind function, or the forward function.

At least one aspect is directed to a computer program product that, when implemented on a data processing system of an application delivery component, is configured to cause the data processing system to perform the method of generating voice-based software applications.

The individual features and/or combinations of features defined above in accordance with any aspect of the present invention or below in relation to any specific embodiment of the invention may be utilized, either separately and individually, alone or in combination with any other defined feature, in any other aspect or embodiment of the invention.

Furthermore, the present invention is intended to cover apparatus configured to perform any feature described herein in relation to a method and/or a method of using or producing, using or manufacturing any apparatus feature described herein.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
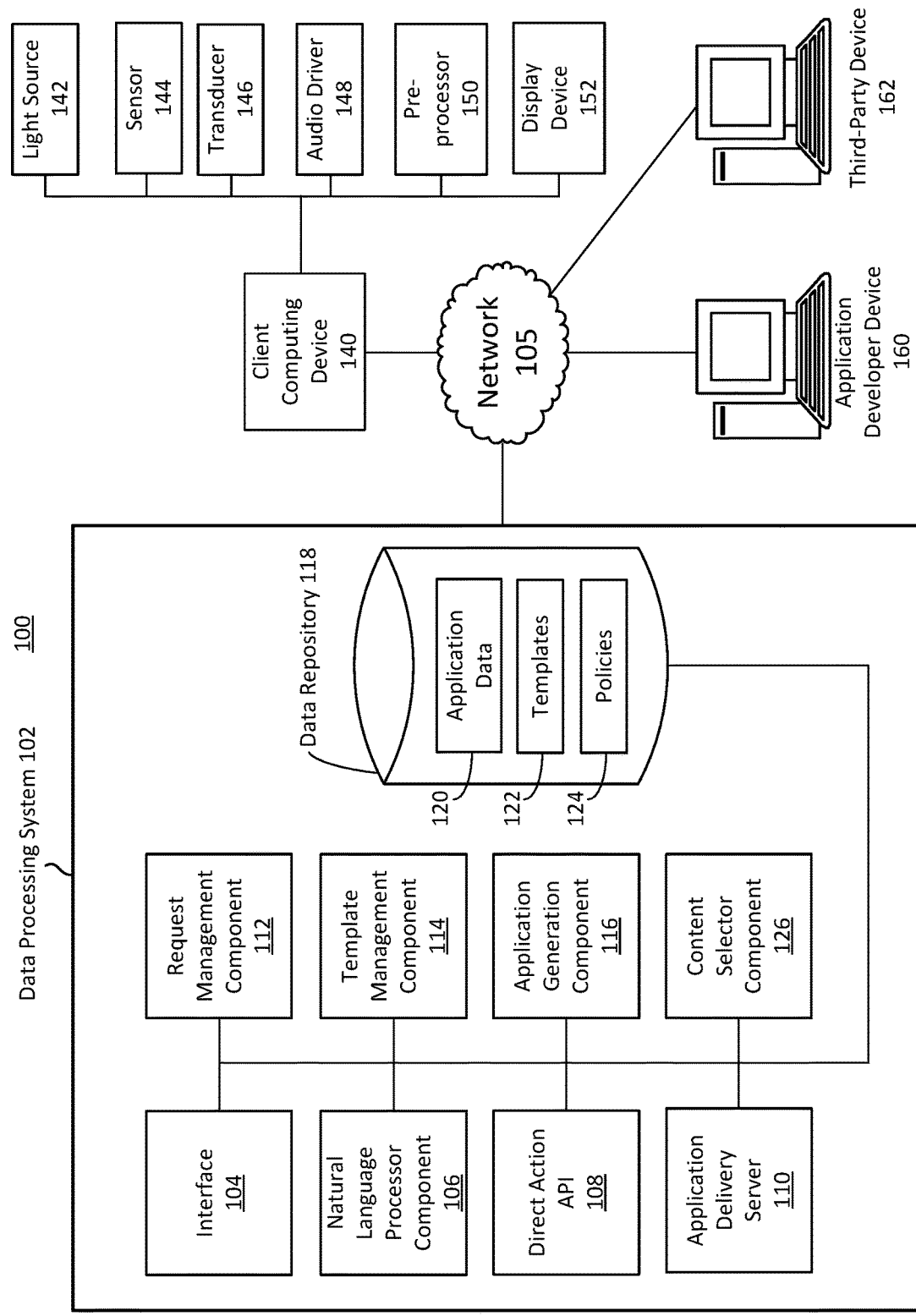
FIG. 1 is an illustration of an example system to generate voice-based software applications.

Following below are more detailed descriptions of various concepts related to, and implementations of, methods, apparatuses, and systems of generating voice-based software applications. The various concepts introduced above and discussed in greater detail below may be implemented in any of numerous ways.

This disclosure is generally directed to generating and updating voice-based software applications using application templates. For example, systems and methods of this disclosure can automatically build a voice-based software application based on a limited number of inputs provided by an application developer. An application developer may want to create an application that can be used by an end user to perform any of a wide range of functions, which may relate to one or more services or features provided by the application developer. The software application can execute on a client computing device, which may be a mobile computing device such as a smart phone or tablet, a laptop computer, a desktop computer, or the like. The application can make use of any input or output features of the client computing device, such as an electronic display, a speaker or other audio output device, a microphone or other audio input device, a keyboard, a touchscreen, a wireless communication interface, etc. Thus, the software application can be configured to display text, images, or videos on the client computing device, as well as user interface elements to allow a user to interact with the software application. The software application can also be configured to cause the client computing device to communicate with one or more external computing devices, such as remote server devices.

It may be difficult for the application developer to create the application in an efficient manner and in a format that presents the end user with information and controls to perform the functions associated with the application. For example, the application developer may be required to write or otherwise generate low-level computer instructions or code corresponding to the application, which can be a time consuming and error-prone process. The systems and methods of this disclosure can select an application template for the application developer based on the desired functions of the application. The application template can be used by the application developer to more quickly and easily develop the application, relative to manually writing the computer code for the application.

The technical solution of this disclosure includes a data processing system that can select the application template based on the functionality to be provided by the application. For example, the system can determine or select the application template responsive to receiving a request from the developer to build the application. The data processing system can maintain one or more policies that can be used to select an application template. A policy can be any set of rules or heuristics for selecting one or more application templates based on a request from an application developer. For example, the data processing system can determine an intent of the application developer based on the request. The intent can be or can relate to a purpose of the application, a functionality to be provided by the application, or a type of the application. For example, an intent can relate to the application developer's desire to build the application to provide functionality relating to allowing a user to request a car through a ridesharing service, providing a weather forecast, streaming video from a third-party content provider, streaming music, providing a social media platform, etc.

Applications having a common type or purpose may tend to have at least some features in common. For example, applications intended to provide streaming video to a client computing device may generally include video display functionality, video control functionality, and the like. As a result, at least some of the code used to build such applications may be common (e.g., reusable) across the applications. To improve the speed and ease of building such applications, a module corresponding to the reusable code can be provided to an application developer, along with one or more fields in which the developer can enter inputs to customize a non-reusable or customized aspect of the module. For example, a video display module may include reusable functionality such as a video display area, a rewind interface element (e.g., a button or voice-activated interface element), a play interface element, a pause interface element, and a fast forward interface element. Non-reusable or customizable aspects of such a module can relate to the particular video content to be displayed within the video display area. Thus, using such a module, an application developer can be enabled to quickly build the software application by providing inputs relating to the video content to be displayed, and the data processing system can automatically generate the code needed to build the reusable aspects of the video display application. As a result, the developer need not spend additional time writing code corresponding to the reusable aspects of the application, such as the video control features (e.g., interface elements), thereby improving the efficiency with which the application can be generated.

The data processing system can select a template having one or more modules and can provide the template to the application developer. The data processing system can select the template from among a plurality of available templates based on the intent of the application developer. The data processing system can parse the request to build the application received from the application developer to determine the intent of the developer. For example, the request can include a text string or an audio input (e.g., voice input) received from the application developer. The data processing system can parse the text string or audio input, for example using natural language processing, to determine the intent of the application developer. The data processing system may also receive the intent directly from the application developer, for example via the request to build the application. For example, the data processing system may provide a list of possible intents (e.g., a list including a plurality of types of applications or functions to be enabled by the application), and the developer can provide an input corresponding to a selection of one of the possible intents to the data processing system.

Based on the intent, the data processing system can select the template to be provided to the developer using one or more policies. A policy can be or can include a mapping of an intent with a respective template. The data processing system can refer to the one or more policies to select an appropriate template. A policy may identify more than one template based on a single intent. The data processing system can provide all identified templates to the application developer, or can select one template from among the multiple templates identified according to the policy to provide to the application developer. The data processing system can also modify a template before the template is provided to the application developer. For example, a template may include one or more modules such as the video display module described above. The data processing system may add one or more additional modules, or remove one or more modules, from the template to generate a modified template. The data processing system can add or remove modules from a template based on an input received from the application developer. For example, the data processing system may provide a list of available modules to the application developer, and the application developer can make a selection of one or more of the available modules. The data processing system can generate a new template to include the selected modules, or can select an existing template having the selected modules. The data processing system can also modify an existing template to create a modified template having the selected modules.

The application developer can provide one or more inputs for each module of a template. For example, the inputs can correspond to unpopulated or blank fields for the modules of the template. For example, a video display module may include a field in which the application developer can enter information relating to the particular video content to be displayed. The application developer can provide the video content itself (e.g., a video file) or can specify a location from which the video content can be retrieved (e.g., a uniform resource locator (URL) of a website that hosts the video content). In other examples, the application developer can provide text-based input for modules relating to textual content (e.g., a text string to be displayed in a title module) locations to be displayed in a map-related module, etc. The data processing system can receive the inputs from the application developer and can generate the application based on the inputs. For example, the data processing system can automatically generate the application by filling in placeholder slots in the application code with code that corresponds to the inputs provided by the application developer. Code corresponding to the reusable or non-customizable aspects of each module may remain unchanged. For example, the data processing system may maintain the reusable portions of code corresponding to each module or template in a data repository, and may retrieve them from the data repository as needed. Then, the data processing system can populate blank placeholder portions of the code based on the inputs provided by the application developer to generate the code for the application.

The data processing system can automatically update the application when an update to the standardized or reusable code of a module becomes available. For example, the data processing system can store the inputs received from the application developer in a data repository, along with the modules or templates to which the inputs correspond. When an update to one of the modules or templates becomes available, the data processing system can regenerate the application based on the updated module or template. For example, an update may include a change to the functionality of a reusable portion of the code for a module, such as a change or improvement to a user interface element (e.g., additional or modified video controls that were not available in an earlier version of a video display module). Thus, the data processing system can automatically update the application without any additional input or action from the application developer. As a result, the data processing system can allow software applications to be developed more efficiently and updated automatically. Developing an application using an application template can ensure that the application remains compatible with the module after the module is updated. This can allow additional functionality to be added to the application by the administrator of the data processing system, for example via an updated module, without errors being unintentionally introduced into the application as a result of the update. Further, the application can make use of that additional functionality immediately, without any additional input or action from the application developer.

FIG. 1 illustrates an example system 100 to generate voice-based software applications. The system 100 can include application delivery infrastructure. The system 100 can include an online application store or marketplace. The system 100 can include a data processing system 102. The data processing system 102 can communicate with one or more of an application developer device 160, a third-party device 162, or a client computing device 140 via network 105. The system 100 can also communicate with other devices, such as content provider devices or digital surface devices.

The network 105 can include computer networks such as the Internet, local, wide, metro, or other area networks, intranets, satellite networks, and other communication networks such as voice or data mobile telephone networks. The network 105 can be used to access information resources such as web pages, web sites, domain names, or URLs that can be presented, output, rendered, or displayed on at least one client computing device 140, such as a laptop, desktop, tablet, digital assistant device, smart phone, wearable device, portable computers, or speaker. For example, via the network 105 a user of the client computing device 140 can access information or data provided by the data processing system 102 or application developer device 160.

The network 105 can include or constitute a display network, e.g., a subset of information resources available on the internet that are associated with a content placement or search engine results system, or that are eligible to include third party digital components as part of a digital component placement campaign. The network 105 can be used by the data processing system 102 to access information resources such as web pages, web sites, domain names, or uniform resource locators that can be presented, output, rendered, or displayed by the client computing device 140. For example, via the network 105 a user of the client computing device 140 can access information or data provided by the data processing system 102 or the application developer device 160.

The network 105 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 105 may include a wireless link, such as an infrared channel or satellite band. The topology of the network 105 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data may be transmitted via different protocols, or the same types of data may be transmitted via different protocols.

The system 100 can include at least one data processing system 102. The data processing system 102 can include at least one logic device such as a computing device having a processor to communicate via the network 105, for example with the client computing device 140 or the application developer device 160 or other networked device or third-party device 162. The data processing system 102 can include at least one computation resource, server, processor, or memory. For example, the data processing system 102 can include a plurality of computation resources or servers located in at least one data center. The data processing system 102 can include multiple, logically-grouped servers and can facilitate distributed computing techniques. The logical group of servers may be referred to as a data center, a server farm, or a machine farm. The servers can also be geographically dispersed. A data center or machine farm may be administered as a single entity, or the machine farm can include a plurality of machine farms. The servers within each machine farm can be heterogeneous—one or more of the servers or machines can operate according to one or more type of operating system platform.

Servers in the machine farm can be stored in high-density rack systems, along with associated storage systems, and located in an enterprise data center. For example, consolidating the servers in this way may improve system manageability, data security, the physical security of the system, and system performance by locating servers and high performance storage systems on localized high performance networks. Centralization of all or some of the data processing system 102 components, including servers and storage systems, and coupling them with advanced system management tools allows more efficient use of server resources, which saves power and processing requirements and reduces bandwidth usage.

The system 100 can include, access, or otherwise interact with at least one third-party device 162. The third-party device 162 can include at least one logic device such as a computing device having a processor to communicate via the network 105, for example with the computing device 140, the data processing system 102, or the application developer device 160. The third-party device 162 can include at least one computation resource, server, processor or memory. For example, third-party device 162 can include a plurality of computation resources or servers located in at least one data center.

The third-party device 162 can provide digital components for presentation via a client computing device 140. The client computing device 140 can present the digital component via an application. The digital component can include one or more of text, images, audio, video, hyperlinks, multimedia content, or interactivity. The digital component can be a text-only digital component, an audio-only digital component, a video digital component, or include a combination of visual content and audio content. For example, the third-party device 162 can provide audio-based digital components for presentation or display by the client computing device 140 as an audio output digital component. The digital component can include an offer for a good or service, such as a voice based message that states: "Would you like me to order you a taxi?" For example, the third-party device 162 can include memory to store a series of audio digital components that can be provided in response to a voice based query. The third-party device 162 can also provide audio based digital components (or other digital components) to the data processing system 102 where they can be stored in the data repository 118. The data processing system 102 (e.g., via a content selector component 126) can select the audio digital components and provide (or instruct the third-party device 162 to provide) the audio digital components to the client computing device 140. The audio based digital components can be exclusively audio or can be combined with text, image, or video data.

The third-party device 162 can include, interface with, or otherwise communicate with the data processing system 102. The third-party device 162 can include, interface, or otherwise communicate with the client computing device 140. The third-party device 162 can include, interface, or otherwise communicate with the computing device 140, which can be a mobile computing device. The third-party device 162 can include, interface, or otherwise communicate with the application developer device 160. For example, the third-party device 162 can provide a digital component to the client computing device 140 for execution by the client computing device 140. The third-party device 162 can provide the digital component to the data processing system 102 for storage by the data processing system 102. The third-party device 162 can provide rules or parameters relating to the digital component to the data processing system 102.

The client computing device 140 can download an application developed by the application developer device 160. The client computing device 140 can download the application from the data processing system 102 via the network 105. The client computing device can download the application from the application delivery component 110. The client computing device 140 can install the application. The client computing device 140 can execute the application. The client computing device 140 can execute, launch, trigger or otherwise access or use the application responsive to a user input or trigger event or condition. The application can include a front-end component and a back-end component. The client computing device 140 can execute or provide the front-end component of the application, while the data processing system 102 or application developer device 160 provides a back-end component of the application.

The client computing device 140 can include, interface, or otherwise communicate with at least one sensor 144, transducer 146, audio driver 148, or pre-processor 150. The client computing device 140 can include a light source 142 or display device 152, such as a light indicator, light emitting diode ("LED"), organic light emitting diode ("OLED"), or other visual indicator configured to provide a visual or optic output. The sensor 144 can include, for example, an ambient light sensor, proximity sensor, temperature sensor, accelerometer, gyroscope, motion detector, GPS sensor, location sensor, microphone, or touch sensor. The transducer 146 can include a speaker or a microphone. The audio driver 148 can provide a software interface to the hardware transducer 146. The audio driver can execute the audio file or other instructions provided by the data processing system 102 to control the transducer 146 to generate a corresponding acoustic wave or sound wave. The pre-processor 150 can include a processing unit having hardware configured to detect a keyword and perform an action based on the keyword. The pre-processor 150 can filter out one or more terms or modify the terms prior to transmitting the terms to the data processing system 102 for further processing. The pre-processor 150 can convert the analog audio signals detected by the microphone into a digital audio signal, and transmit one or more data packets carrying the digital audio signal to the data processing system 102 via the network 105. In some cases, the pre-processor 150 can transmit data packets carrying some or all of the input audio signal responsive to detecting an instruction to perform such transmission. The instruction can include, for example, a trigger keyword or other keyword or approval to transmit data packets comprising the input audio signal to the data processing system 102.

The client computing device 140 can be associated with an end user that enters voice queries as audio input into the client computing device 140 (via the sensor 144) and receives audio output in the form of a computer generated voice that can be provided from the data processing system 102 (or the application developer device 160 or the third-party device 162) to the client computing device 140, output from the transducer 146 (e.g., a speaker). The computer generated voice can include recordings from a real person or computer generated language.

The client computing device 140 (or computing device, or client device, or digital device) may or may not include a display. For example, the client computing device 140 may include limited types of user interfaces, such as a microphone and speaker. In some cases, the primary user interface of the computing device 140 may be a microphone and speaker, or voice interface. For example, the primary user interface of the client computing device 140 can include a voice-based or audio-based user interface. The client computing device 140 can include a display and have the primary user interface be voice-based or audio-based. The primary user interface of the client computing device 140 can be conversational. A conversational user interface can refer to a user interface that is at least in part driven or facilitated by a natural language processor ("NLP") component 106 of the data processing system 102.

The data processing system 102 can include a content placement system having at least one computation resource or server. The data processing system 102 can include, interface, or otherwise communicate with at least one interface 104. The data processing system 102 can include, interface, or otherwise communicate with at least one NLP component 106. The data processing system 102 can include, interface, or otherwise communicate with at least one direct action application programming interface ("API") 108. The interface 104, NLP component 106 and direct action API 108 can provide a conversational API or digital assistant functionality. The conversational API or digital assistant can communicate or interface with one or more voice-based interfaces or various digital assistant devices or surfaces in order to provide data or receive data or perform other functionality.

The data processing system 102 can include, interface, or otherwise communicate with at least one application delivery component 110. The data processing system 102 can include, interface, or otherwise communicate with at least one request management component 112. The data processing system 102 can include, interface, or otherwise communicate with at least one template management component 114. The data processing system 102 can include, interface, or otherwise communicate with at least one application generation component 116. The data processing system 102 can include, interface, or otherwise communicate with at least one content selector component 126.

The interface 104, NLP component 106, direct action API 108, application delivery component 110, request management component 112, template management component 114, application generation component 116, and content selector component 126 can each include at least one processing unit or other logic device such as programmable logic array engine, or module configured to communicate with the data repository 118 or other database. The interface 104, NLP component 106, direct action API 108, application delivery component 110, request management component 112, template management component 114, application generation component 116, content selector component 126, and data repository 118 can be separate components, a single component, or part of the data processing system 102. The system 100 and its components, such as a data processing system 102, can include hardware elements, such as one or more processors, logic devices, or circuits.

The data processing system 102 can obtain anonymous computer network activity information associated with a plurality of client computing devices 140 (or computing device or digital assistant device). A user of a client computing device 140 or mobile computing device can affirmatively authorize the data processing system 102 to obtain network activity information corresponding to the client computing device 140 or mobile computing device. For example, the data processing system 102 can prompt the user of the computing device 140 for consent to obtain one or more types of network activity information. The client computing device 140 can include a mobile computing device, such as a smartphone, tablet, smartwatch, or wearable device. The identity of the user of the client computing device 140 can remain anonymous and the computing device 140 can be associated with a unique identifier (e.g., a unique identifier for the user or the computing device provided by the data processing system or a user of the computing device). The data processing system can associate each observation with a corresponding unique identifier.

The data processing system 102 can interface with a third-party device 162. The third-party device 162 can include or refer to a device of a content provider or digital component provider. The content provider can establish an electronic content campaign. The electronic content campaign can be stored as content data in the data repository 118. An electronic content campaign can refer to one or more content groups that correspond to a common theme. A content campaign can include a hierarchical data structure that includes content groups, digital component data objects, and content selection criteria. To create a content campaign, the content provider can specify values for campaign level parameters of the content campaign. The campaign level parameters can include, for example, a campaign name, a preferred content network for placing digital component objects, a value of resources to be used for the content campaign, start and end dates for the content campaign, a duration for the content campaign, a schedule for digital component object placements, language, geographical locations, type of computing devices on which to provide digital component objects. In some cases, an impression can refer to when a digital component object is fetched from its source (e.g., data processing system 102 or content provider), and is countable. In some cases, due to the possibility of click fraud, robotic activity can be filtered and excluded, as an impression. Thus, in some cases, an impression can refer to a measurement of responses from a Web server to a page request from a browser, which is filtered from robotic activity and error codes, and is recorded at a point as close as possible to opportunity to render the digital component object for display on the computing device 140. In some cases, an impression can refer to a viewable or audible impression; e.g., the digital component object is at least partially (e.g., 20%, 30%, 30%, 40%, 50%, 60%, 70%, or more) viewable on a display device 152 of the client computing device 140, or audible via a speaker (e.g., transducer 146) of the client computing device 140. A click or selection can refer to a user interaction with the digital component object, such as a voice response to an audible impression, a mouse-click, touch interaction, gesture, shake, audio interaction, or keyboard click. A conversion can refer to a user taking a desired action with respect to the digital component objection; e.g., purchasing a product or service, completing a survey, visiting a physical store corresponding to the digital component, or completing an electronic transaction.

The content provider can further establish one or more content groups for a content campaign. A content group includes one or more digital component objects and corresponding content selection criteria, such as keywords, words, terms, phrases, geographic locations, type of computing device, time of day, interest, topic, or vertical. Content groups under the same content campaign can share the same campaign level parameters, but may have tailored specifications for particular content group level parameters, such as keywords, negative keywords (e.g., that block placement of the digital component in the presence of the negative keyword on main content), bids for keywords, or parameters associated with the bid or content campaign.

To create a new content group, the content provider can provide values for the content group level parameters of the content group. The content group level parameters include, for example, a content group name or content group theme, and bids for different content placement opportunities (e.g., automatic placement or managed placement) or outcomes (e.g., clicks, impressions, or conversions). A content group name or content group theme can be one or more terms that the content provider can use to capture a topic or subject matter for which digital component objects of the content group is to be selected for display. For example, a car dealership can create a different content group for each brand of vehicle it carries, and may further create a different content group for each model of vehicle it carries. Examples of the content group themes that the car dealership can use include, for example, "Make A sports car" "Make B sports car," "Make C sedan," "Make C truck," "Make C hybrid," or "Make D hybrid." An example content campaign theme can be "hybrid" and include content groups for both "Make C hybrid" and "Make D hybrid", for example.

The content provider can provide one or more keywords and digital component objects to each content group. Keywords can include terms that are relevant to the product or services of associated with or identified by the digital component objects. A keyword can include one or more terms or phrases. For example, the car dealership can include "sports car," "V-6 engine," "four-wheel drive," "fuel efficiency," as keywords for a content group or content campaign. In some cases, negative keywords can be specified by the content provider to avoid, prevent, block, or disable content placement on certain terms or keywords. The content provider can specify a type of matching, such as exact match, phrase match, or broad match, used to select digital component objects.

The content provider can provide one or more keywords to be used by the data processing system 102 to select a digital component object provided by the content provider. The content provider can identify one or more keywords to bid on, and further provide bid amounts for various keywords. The content provider can provide additional content selection criteria to be used by the data processing system 102 to select digital component objects. Multiple content providers can bid on the same or different keywords, and the data processing system 102 can run a content selection process or ad auction responsive to receiving an indication of a keyword of an electronic message.

The content provider can provide one or more digital component objects for selection by the data processing system 102. The data processing system 102 can include a content selector component 126 designed, constructed and operational to select the digital component objects when a content placement opportunity becomes available that matches the resource allocation, content schedule, maximum bids, keywords, and other selection criteria specified for the content group. Different types of digital component objects can be included in a content group, such as a voice digital component, audio digital component, a text digital component, an image digital component, video digital component, multimedia digital component, or digital component link. A digital component object (or digital component) can include, for example, a content item, an online document, audio, images, video, multimedia content, or sponsored content. Upon selecting a digital component, the data processing system 102 can transmit the digital component object for rendering on a computing device 140, for audio output via a speaker or transducer 146, or for display device 152 of the computing device 140. Rendering can include displaying the digital component on a display device, or playing the digital component via a speaker of the computing device 140. The data processing system 102 can provide instructions to a computing device 140 to render the digital component object. The data processing system 102 can instruct the computing device 140, or an audio driver 148 of the computing device 140, to generate audio signals or acoustic waves. The data processing system 102 can instruct an application generated via the data processing system 102 and executed by the computing device 140 to present the selected digital component object. For example, the application generated by the data processing system can include a slot (e.g., a content slot or digital component slot) in which the digital component object can be presented (e.g., audio slot or visual slot). An audio slot can refer to a time interval in which to play the audio digital component. A visual slot can refer to a portion of a graphical user interface of the application in which to display the digital component. A visual slot can be, for example, an inline frame in which the digital component can be rendered.

The data repository 118 can include one or more local or distributed databases, and can include a database management system. The data repository 118 can include computer data storage or memory and can store one or more of application data 120, templates 122, or policies 124, among other data. The data repository 118 can store the one or more of application data 120, the templates 122, or the policies 124 in one or more data structures, databases, data files, indexes, or other type of data storage.

The application data 120 can include information about an application. The application data 120 can include information about an application submitted by an application developer device 160. The application data 120 can include metadata associated with an application. Application data 120 can include, for example, a title of an application, short description, detail description, version identifier, entities, actions, intents, compatibility information, size, type of application, category of the application, among other information. Application data 120 can include a unique identifier of the application, such as an alphanumeric identifier. Application data 120 can include information about the application developer that provided or submitted the application.

The application data 120 may also include information such as computer code relating to the template 122. The templates 122 can be or can refer to standardized, reusable, or non-customizable portions of computer code for building a software application, along with one or more blank or unpopulated fields that can be populated with customized code. The standardized portions of a template 122 can be common across a variety of applications. As a result, the standardized portions of a template 122 can be reused so as to avoid the necessity for the application developer device 160 to generate the code corresponding to the standardized portion of a template 122. For example, a template can include one or more modules each corresponding to a respective function of an application. Each module can include one or more blank or unpopulated fields that can be populated based on an input received from the application developer device 160. Modules of a template may correspond to functions such as displaying a video content item, display text, providing navigation controls (e.g., buttons to allow a user to move between pages of application), providing hyperlinks to other pages of the application or external web sites, providing user-selectable interface elements (e.g., fillable text fields, radio buttons, check boxes, dropdown menus, etc.), or any other feature of an application. A template 122 may include any number of modules. Each template 122 may correspond to a particular type or types of applications. For example, a template 122 that includes a video display module may correspond to a streaming video application, a template 122 that includes a module for displaying text may correspond to an e-reader application, etc. In this disclosure, a "type" of an application can also be referred to as a "vertical." Some templates 122 may correspond to more than one type of application. An application can also be built using more than one template 122.

Figure 2:
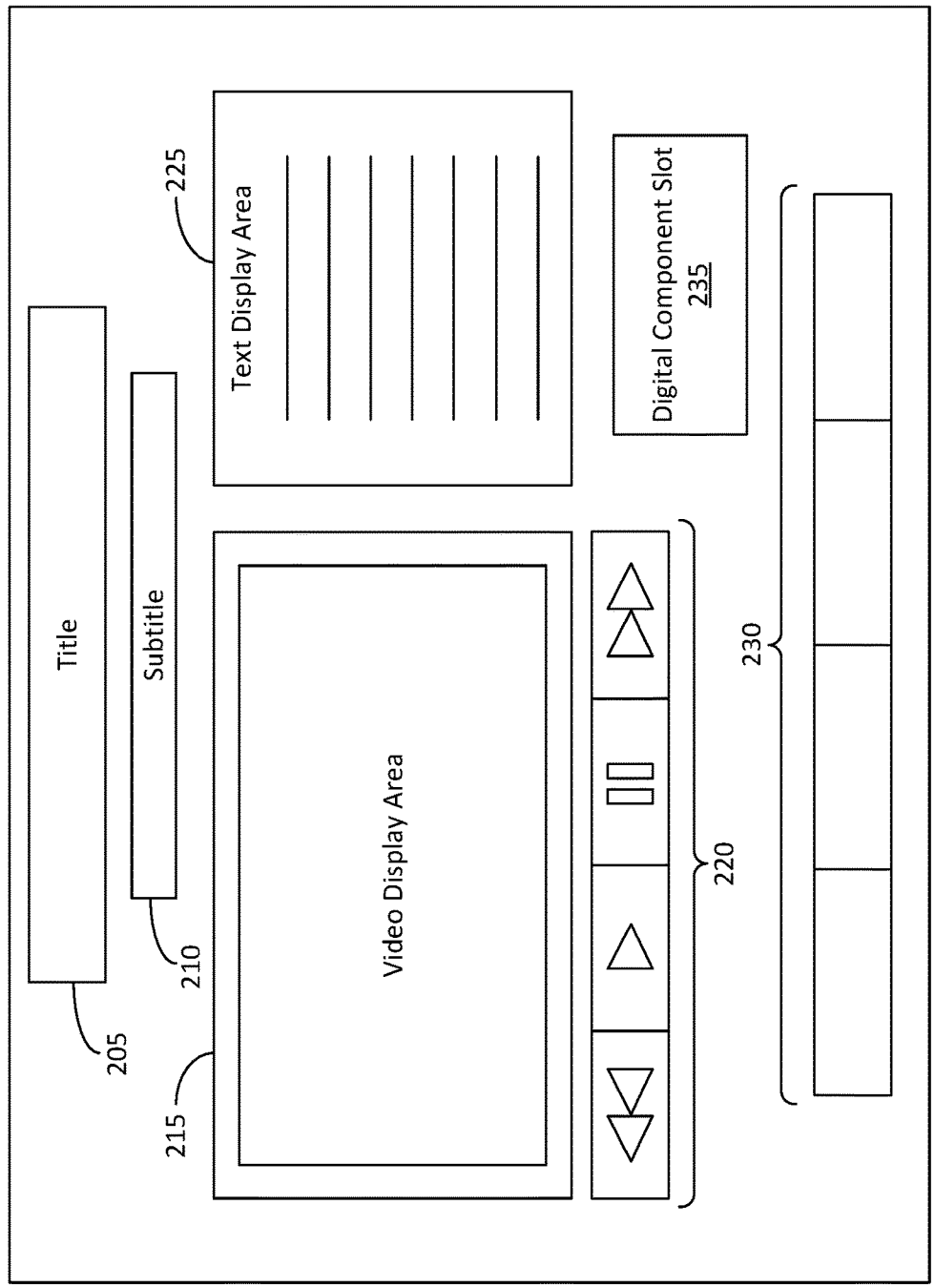
FIG. 2 is an illustration of a graphical representation of an application template for generating voice-based software applications.

Referring now to FIG. 2, depicted is an illustration of a graphical representation of an application template 122 for generating voice-based software applications. The template 122 depicted in FIG. 2 is illustrative only, and other templates 122 may include additional or different modules than those illustrated in FIG. 2. As shown, the template 122 of FIG. 2 can include a plurality of modules each corresponding to one or more features of an application. For example, a title module 205 can correspond to a title of an application or a title of a page within an application. A subtitle module 210 can correspond to a subtitle of the application or a subtitle of a page of the application. A video display module 215 can provide a video display area in which video content can be shown via the application. A video controls module 220 can provide user interface elements to allow a user to control aspects of the video display module 215. A text display module 225 can provide a text display area in which text-based content can be shown via the application. An application navigation module 230 can provide user interface elements to allow a user to navigate between pages of the application.

Each of the modules included in the template 122 may include at least some standardized code. For example, the video controls module 220 may include standardized text corresponding to an appearance, arrangement, or position of each button within the video controls module 220, as well as standardized code relating to the user interaction with each of the buttons of the video controls module 220. For example, the video controls module 220 may include standardized code configured to detect a user interaction (e.g., a click of a mouse) and to perform an associated action on the video displayed in the video display area of the video display module 215 (e.g., pausing the video in response to detecting a user interaction with a pause button provided by the video controls module 220). Each module of the template 122 may also include standardized code relating to non-visual aspects of the application. For example, the video controls module 220 may include standardized code allowing a user to interact with video content in the video display area of the video display module 215 via an audio-based input. Accordingly, the video controls module 220 may include standardized code configured to detect an audio input (e.g., a user's voice) and to parse the audio input to determine a trigger word that can an interaction with the video content displayed in the video display area of the video display module 215. For example, the video controls module 220 may include standardized code to detect the word "play" in the audio input, and to respond by playing the video content in the video display area of the video display module 215.

The other modules of the template 122 may also include standardized code to provide corresponding functions. For example, the title module 205, the subtitle module 210, and the text display module 225 can each include standardized code relating to a font, a color, a position, an orientation, or any other aspects of the text content to be displayed in the respective modules. At least some of the modules of the template 122 can also include placeholders or blank fields corresponding to customizable aspects of the modules. For example, the title module 205, the subtitle module 210, and the text display module 225 can each include a blank field corresponding to one or more text strings to be displayed by these modules. Similarly, the video display module 215 may include a blank field corresponding to the particular video content to be displayed in the video display area. The video content can be specified as a video file or a pointer to a location from which the video content can be retrieved (e.g., a URL for a website that hosts the video content to be displayed in the video display area of the video display module 215).

Using the template 122, an application developer can provide inputs corresponding to the customizable portions of each of the modules included in the template 122. For example, referring again to FIG. 1, the data processing system 102 can provide the template 122 of FIG. 2 to the application developer device 160. A developer can use the application developer device 160 to enter inputs for the customizable portions of the title module 205, the subtitle module 210, the video display module 215, and the text display module 225. The application developer device 160 can transmit the inputs back to the data processing system 102 via the network 105. In response, the data processing system 102 or a component thereof such as application generation component 116 can generate an application using the standardized code for each module along with the user inputs corresponding to the customizable aspects of each module of the template 122. Thus, the application developer device 160 may provide only a limited amount of information (e.g., the inputs for the blank or unpopulated fields of the modules of the template 122), and the data processing system 102 can use that limited information to generate the complete application.

The template 122 depicted in FIG. 2 is illustrative only. For example, a template 122 may include additional or different modules than are depicted the template 122 of FIG. 2. In addition, the template 122 may be formatted differently than is depicted in FIG. 2. For example, while FIG. 2 illustrates the template 122 as a graphical representation of the relative position and arrangement of the title module 205, the subtitle module 210, the video display module 215, the video controls module 220, the text display module 225, and the application navigation module 230, in some implementations, the template 122 may not be formatted in a graphical manner. For example, the template 122 may instead be formatted as an extensible markup language (XML) document, a hypertext transfer protocol (HTML) document, or another non-graphical file type. The template 122 may be displayed within a graphical user interface on the application developer device 160. The graphical user interface can be a web-based graphical user interface. The graphical user interface can be an interface of a dedicated software development application.

Referring again to FIG. 1, each policy 124 can be or can include one or more rules, heuristics, instructions, or other information that can be used by the data processing system 102 to select one of the templates 122 to be provided to the application developer device 160. The data processing system 102 or a component thereof such as the request management component 112 can receive a request from the application developer device 160 to build an application. The data processing system 102 can select one or more templates 122 to provide to the application developer device 160 based on the request and the policies 124. For example, the request can be or can include an intent of the developer, and the policies 124 can be used to select one or more templates based on the intent. In some implementations, the policies 124 can include one or more mappings of intents with respective templates 122. The policies 124 can also include rules, heuristics, or other instructions for selecting a template 122 based on a type of the application to be generated. For example, the type may be or may include the intent. The data processing system 102 may also derive the type of the application from the intent.

The data processing system 102 can include an interface 104 (or interface component) designed, configured, constructed, or operational to receive and transmit information using, for example, data packets. The interface 104 can receive and transmit information using one or more protocols, such as a network protocol. The interface 104 can include a hardware interface, software interface, wired interface, or wireless interface. The interface 104 can facilitate translating or formatting data from one format to another format. For example, the interface 104 can include an application programming interface that includes definitions for communicating between various components, such as software components. The interface 104 can communicate with one or more of the client computing device 140, application developer device 160, or third-party device 162 via network 105.

The data processing system 102 can interface with an application, script or program installed at the client computing device 140, such as an app to communicate input audio signals to the interface 104 of the data processing system 102 and to drive components of the local client computing device to render output audio signals. The data processing system 102 can receive data packets or one or more other signals that include or identify an audio input signal.

The data processing system 102 can include an NLP component 106. For example, the data processing system 102 can execute or run the NLP component 106 to receive or obtain the audio signal and parse the audio signal. For example, the NLP component 106 can provide for interactions between a human and a computer. The NLP component 106 can be configured with techniques for understanding natural language and allowing the data processing system 102 to derive meaning from human or natural language input. The NLP component 106 can include or be configured with technique based on machine learning, such as statistical machine learning. The NLP component 106 can utilize decision trees, statistical models, or probabilistic models to parse the input audio signal. The NLP component 106 can perform, for example, functions such as named entity recognition (e.g., given a stream of text, determine which items in the text map to proper names, such as people or places, and what the type of each such name is, such as person, location, or organization), natural language generation (e.g., convert information from computer databases or semantic intents into understandable human language), natural language understanding (e.g., convert text into more formal representations such as first-order logic structures that a computer module can manipulate), machine translation (e.g., automatically translate text from one human language to another), morphological segmentation (e.g., separating words into individual morphemes and identify the class of the morphemes, which can be challenging based on the complexity of the morphology or structure of the words of the language being considered), question answering (e.g., determining an answer to a human-language question, which can be specific or open-ended), semantic processing (e.g., processing that can occur after identifying a word and encoding its meaning in order to relate the identified word to other words with similar meanings).

The NLP component 106 can convert the audio input signal into recognized text by comparing the input signal against a stored, representative set of audio waveforms (e.g., in the data repository 118) and choosing the closest matches. The set of audio waveforms can be stored in data repository 118 or other database accessible to the data processing system 102. The representative waveforms are generated across a large set of users, and then may be augmented with speech samples from the user. After the audio signal is converted into recognized text, the NLP component 106 matches the text to words that are associated, for example via training across users or through manual specification, with actions that the data processing system 102 can serve. Aspects or functionality of the NLP component 106 can be performed by the data processing system 102 or the client computing device 140. For example, a local NLP component can execute on the client computing device 140 to perform aspects of converting the input audio signal to text and transmitting the text via data packets to the data processing system 102 for further natural language processing.

The audio input signal can be detected by the sensor 144 or transducer 146 (e.g., a microphone) of the client computing device 140. Via the transducer 146, the audio driver 148, or other components the client computing device 140 can provide the audio input signal to the data processing system 102 (e.g., via the network 105) where it can be received (e.g., by the interface 104) and provided to the NLP component 106 or stored in the data repository 118.

The client computing device 140 can include an audio driver 148, a transducer 146, a sensor 144 and a pre-processor 150. The sensor 144 can receive or detect an input audio signal (e.g., voice input). The pre-processor 150 can be coupled to the audio driver, the transducer, and the sensor. The pre-processor 150 can filter the input audio signal to create a filtered input audio signal (e.g., by removing certain frequencies or suppressing noise). The pre-processor 150 can convert the filtered input audio signal to data packets (e.g., using a software or hardware digital-to-analog converter). In some cases, the pre-processor 150 can convert the unfiltered input audio signal to data packets and transmit the data packets to the data processing system 102. The pre-processor 150 can transmit the data packets to a data processing system 102 comprising one or more processors and memory that execute a natural language processor component, an interface, a speaker recognition component, and a direct action application programming interface.

The data processing system 102 can receive, via the interface, from the pre-processor component, the data packets comprising the filtered (or unfiltered) input audio signal detected by the sensor. The data processing system 102 can identify an acoustic signature from the input audio signal. The data processing system 102 can identify, based on a lookup in a data repository (e.g., querying a database), an electronic account corresponding to the acoustic signature. The data processing system 102 can establish, responsive to identification of the electronic account, a session and an account for use in the session. The account can include a profile having one or more policies. The data processing system 102 can parse the input audio signal to identify a request and a trigger keyword corresponding to the request.

The data processing system 102 can provide, to the pre-processor 150 of the client computing device 140, a status. The client computing device 140 can receive the indication of the status. The audio driver can receive the indication of the status of the profile, and generate an output signal based on the indication. The audio driver can convert the indication to an output signal, such as sound signal, or acoustic output signal. The audio driver can drive the transducer 146 (e.g., speaker) to generate sound based on the output signal generated by the audio drive.

In some cases, the client computing device 140 can include a light source 142. The light source can include one or more LEDs, lights, display, or other component or device configured to provide an optical or visual output. The pre-processor 150 can cause the light source to provide a visual indication corresponding to the status. For example, the visual indication can be a status indicator light that turns on, a change in color of the light, a light pattern with one or more colors, or a visual display of text or images.

The NLP component 106 can obtain the input audio signal. From the input audio signal, the NLP component 106 can identify at least one request or at least one trigger keyword corresponding to the request. The request can indicate intent or subject matter of the input audio signal. The trigger keyword can indicate a type of action likely to be taken. The trigger keyword can be a wakeup signal or hotword that indicates to the client computing device 140 to convert the subsequent audio input into text and transmit the text to data processing system 102 for further processing. For example, the NLP component 106 can parse the input audio signal to identify at least one request to leave home for the evening to attend dinner and a movie. The trigger keyword can include at least one word, phrase, root or partial word, or derivative indicating an action to be taken. For example, the trigger keyword "go" or "to go to" from the input audio signal can indicate a need for transport. In this example, the input audio signal (or the identified request) does not directly express an intent for transport, however the trigger keyword indicates that transport is an ancillary action to at least one other action that is indicated by the request.

The NLP component 106 can parse the input audio signal to identify, determine, retrieve, or otherwise obtain the request and the trigger keyword. For instance, the NLP component 106 can apply a semantic processing technique to the input audio signal to identify the trigger keyword or the request. The NLP component 106 can apply the semantic processing technique to the input audio signal to identify a trigger phrase that includes one or more trigger keywords, such as a first trigger keyword and a second trigger keyword. For example, the input audio signal can include the sentence "I want a ride to the airport." The NLP component 106 can apply a semantic processing technique, or other natural language processing technique, to the data packets comprising the sentence to identify the request or trigger phrases "want a ride" and "airport". The NLP component 106 can further identify multiple trigger keywords, such as want and ride. For example, the NLP component 106 can determine that the trigger phrase includes the trigger keyword and a second trigger keyword.

The NLP component 106 can filter the input audio signal to identify the trigger keyword. For example, the data packets carrying the input audio signal can include "It would be great if I could get someone that could help me go to the airport", in which case the NLP component 106 can filter out one or more terms as follows: "it", "would", "be", "great", "if", "I", "could", "get", "someone", "that", "could", or "help". By filtering out these terms, the NLP component 106 may more accurately and reliably identify the trigger keywords, such as "go to the airport" and determine that this is a request for a taxi or a ride sharing service.

In some cases, the NLP component 106 can determine that the data packets carrying the input audio signal includes one or more requests. For example, the input audio signal can include the sentence "I want to purchase an audiobook and monthly subscription to movies." The NLP component 106 can determine this is a request for an audio book and a streaming multimedia service. The NLP component 106 can determine this is a single request or multiple requests. The NLP component 106 can determine that this is two requests: a first request for a service provider that provides audiobooks, and a second request for a service provider that provides movie streaming. In some cases, the NLP component 106 can combine the multiple determined requests into a single request, and transmit the single request to a third-party device 162. In some cases, the NLP component 106 can transmit the individual requests to another service provider device, or separately transmit both requests to the same third-party device 162.

The data processing system 102 can include a direct action API 108 designed and constructed to generate, based on the trigger keyword, an action data structure responsive to the request. The direct action API 108 can generate the action data structure to cause an application to perform the corresponding action. The direct action API 108 can transmit the action data structure to the application installed on the client computing device 140 to cause the client computing device 140 to perform the corresponding action or initiate an action. The action data structure generated by the direct action API 108 can include a deep link for an application installed on the client computing device 140. The application installed on the client computing device 140 can then perform the action or communicate with the application developer device 160 or a third-party device 162 to perform the action.

Processors of the data processing system 102 can invoke the direct action API 108 to execute scripts that generate a data structure to provide to an application installed on the client computing device 140, an application developer device 160, or a third-party device 162 or other service provider to obtain a digital component, order a service or product, such as a car from a car share service or an audiobook. The direct action API 108 can obtain data from the data repository 118, as well as data received with end user consent from the client computing device 140 to determine location, time, user accounts, logistical or other information to allow the third-party device 162 to perform an operation, such as reserve a car from the car share service. Using the direct action API 108, the data processing system 102 can also communicate with the third-party device 162 to complete the conversion by in this example making the car share pick up reservation.

The direct action API 108 can execute a specified action to satisfy the end user's intention, as determined by the data processing system 102. Depending on the action specified in its inputs and the parameters or rules in the data repository 118, the direct action API 108 can execute code or a dialog script that identifies the parameters required to fulfill a user request. The direct action API 108 can execute an application to satisfy or fulfill the end user's intention. Such code can look-up additional information, e.g., in the data repository 118, such as the name of a home automation service, or third-party service, or it can provide audio output for rendering at the client computing device 140 to ask the end user questions such as the intended destination of a requested taxi. The direct action API 108 can determine parameters and can package the information into an action data structure, which can then be sent to another component such as the application delivery component 110 to be fulfilled.

The direct action API 108 can receive an instruction or command from the NLP component 106, or other component of the data processing system 102, to generate or construct the action data structure. The direct action API 108 can determine a type of action in order to select a template stored in the data repository 118. The actions can be fulfilled by application provided by the application delivery component 110 and submitted by an application developer device 160. The application can perform or facilitate the performance of the action. Example types of actions can include, for example, watch action, listen action, read action, navigation action, or weather action. Types of actions can include or be configured to provide, for example, services, products, reservations, tickets, multimedia content, audiobook, manage subscriptions, adjust subscriptions, transfer digital currency, make purchases, or music. Types of actions can further include types of services or products. For example, types of services can include car share service, food delivery service, laundry service, maid service, repair services, household services, device automation services, or media streaming services. Types of products can include, for example, clothes, shoes, toys, electronics, computers, books, or jewelry. Types of reservations can include, for example, dinner reservations or hair salon appointments. Types of tickets can include, for example, movie tickets, sports venue tickets, or flight tickets. In some cases, the types of services, products, reservations or tickets can be categorized based on price, location, type of shipping, availability, or other attributes.

The NLP component 106 can parse the input audio signal to identify a request and a trigger keyword corresponding to the request, and provide the request and trigger keyword to the direct action API 108 to cause the direct action API to generate, based on the trigger keyword, a first action data structure responsive to the request. The direct action API 108, upon identifying the type of request, can access the corresponding template from a template repository (e.g., data repository 118). Templates can include fields in a structured data set that can be populated by the direct action API 108 to further the operation that is requested via input audio detected by the client computing device 140 (such as the operation of sending a taxi to pick up an end user at a pickup location and transport the end user to a destination location). The direct action API 108, or client computing device 140, can launch or trigger an application to fulfill the request in the input audio. For example, a car sharing service application can include one or more of the following fields: device identifier, pick up location, destination location, number of passengers, or type of service. The direct action API 108 can populate the fields with values. To populate the fields with values, the direct action API 108 can ping, poll or otherwise obtain information from one or more sensors 144 of the computing device 140 or a user interface of the device 140. For example, the direct action API 108 can detect the source location using a location sensor, such as a GPS sensor. The direct action API 108 can obtain further information by submitting a survey, prompt, or query to the end of user of the computing device 140. The direct action API can submit the survey, prompt, or query via interface 104 of the data processing system 102 and a user interface of the computing device 140 (e.g., audio interface, voice-based user interface, display, or touch screen). Thus, the direct action API 108 can select a template for the action data structure based on the trigger keyword or the request, populate one or more fields in the template with information detected by one or more sensors 144 or obtained via a user interface, and generate, create or otherwise construct the action data structure to facilitate performance of an operation by the third-party device 162.

The data processing system 102 can include, interface with or otherwise access an application delivery component 110. The application delivery component 110 can also be separate from the data processing system 102. For example, the application delivery component 110 can be a separate system or server from the data processing system 102. The data processing system 102 can communicate with the application delivery component 110 via network 105.

The application delivery component 110 can receive an application submitted by or generated based in part on inputs provided by the application developer device 160. For example, the application developer device 160 may provide inputs for blank or unpopulated modules of one or more templates 122, and the data processing system 102 may generate the application based on the one or more templates 122 and the inputs provided by the application developer device 160. The application delivery component 110 can maintain one or more versions of an application. The application delivery component 110 can transmit the application to a client computing device 140. The application delivery component 110 can download the application onto a client computing device 140. The application delivery component 110 can maintain an online application store or marketplace. The application delivery component 110 can manage or maintain accounts for application developer devices 160 or client computing devices 140. The application delivery component 110 can maintain profiles for the accounts. The accounts or profiles can be associated with a unique identifier. The account can include a financial account or token account that can be used to purchase or subscribe to application. The application delivery component 110 can prompt a user of a client computing device 140 to pay for an application by providing electronic account information, such as an electronic financial account.

The data processing system 102 can also receive information relating to an application from the application developer device 160 in the form of one or more inputs. The inputs may not include a complete application, however the data processing system 102 can be configured to generate an application based on the inputs received from the application developer device 160. For example, the data processing system 102 can receive inputs from the application developer device 160 corresponding to information to be used to populate blank fields of one or more modules of one or more templates 122. The data processing system 102 can generate, construct, build, or otherwise create an application based on the templates and the inputs received from the application developer device 160.

The data processing system 102 can include, interface with or otherwise access a request management component 112. The request management component 112 can receive, process, and manage a request from the application developer device 160. The request may be or may include a request for the data processing system 102 to generate an application. The request management component 112 may communicate with the application developer device 160 to solicit or otherwise prompt the application developer device 160 to provide the request. For example, the request management component 112 may provide an interface (e.g., a graphical user interface) for display on the application developer device 160. A user of the application developer device 160 may interact with the interface to provide the request. The interface may provide one or more selectable options that a user of the application developer device 160 can select when providing the request. For example, the options may correspond to intents of the developer that relate to the application. An intent may be or may relate to one or more functions or purposes of the application. An intent may also correspond to a type of the application. The request management component 112 may provide an interface having a list of available intents or types, and a user of the application developer device 160 may select one or more of the available intents or types when making the request.

The request management component 112 may also be configured to process, parse, or otherwise extract an intent or type from the request. For example, the request received from the application developer device 160 may include a natural language component (e.g., text corresponding to natural language or an audio input corresponding to natural language). The request management component 112 can be configured to process the request to identify at least one intent. The request management component 112 can extract an intent from the request based on keywords or phrases included in the request.

The data processing system 102 can include, interface with or otherwise access a template management component 114. The template management component 114 can maintain the templates 122. The template management component 114 can generate, modify, and update the templates 122. The template management component 114 can generate a template 122 to include one or more modules. A module can refer to a particular function or feature associated with a template 122. The template management component 114 can select related modules to be included with each template 122, based on a type of application associated with the templates 122, or based on an intent of a use of the application developer device 160 that provided the request to build an application. For example, types of applications or intents can be associated with one or more functions, and the template management component 114 can maintain a mapping of the functions with their associated application types or intents. For each application type or intent, the template management component 114 can generate at least one template 122 that includes at least one module corresponding to one or more functions associated with that type of application.

The template management component 114 can receive information related to a request to build an application, for example from the request management component 112. The template management component 114 can select one or more templates 122 to be provided to the application developer device 160 based on the information related to the request. For example, the template management component 114 can receive an indication of a type of application or an intent from the request management component 112. The template management component 114 can select a template 122 that corresponds to the type of application or the intent. Each template 122 may include or may be associated with metadata indicates one or more types of applications or intents to which the template 122 corresponds. The template management component 114 can match the type of the application extracted or determined from the request received from the application developer device 160 with the templates that correspond to that type based on the metadata included in or associated with each template. The template management component 114 can also modify an existing template 122. For example, the template management component 114 can determine that the information received from request management component 112 indicates that the application should include functionality of a combination of modules that may not be included in any existing template 122. In response, the template management component 114 can modify an existing template 122 to add or remove modules, such that the modified template 122 includes an appropriate combination of modules.

The template management component 114 can select a template that includes a slot for a digital component provided by the a third-party device 162. The template can include a module for the slot. The slot can be referred to as a digital component slot, content slot, or digital component slot module. The slot can be a visual slot or an audio slot. The slot can be for both audio and visual information, exclusively audio, or exclusively visual. If the slot is a visual slot, the template can include size and position information for the slot. The size and position information can correspond to a graphical user interface of the application that is to be generated by the application generation component 116. The graphical user interface can correspond to the graphical user interface generated based on the template. For example, template 122 depicted in FIG. 2 depicts digital component slot 235. The digital component slot 235 can be placed in any location on the template 122. In the even the digital component slot 235 is an audio-only slot, then the slot may not include a size and position. Instead, the digital component slot 235 can include audio parameters or properties, such as a duration, time at which to play the audio, volume of the audio output, or what functionality to provide (e.g., skip functionality, fast-forward functionality, rewind functionality, or stop or pause functionality).

The template management component 114 can receive input from the application developer device 160 regarding the digital component slot. The input can include, for example, whether or not to include a digital component slot, format (e.g., audio and/or video), size/position, duration or when to present digital components, or other information used to construct the digital component slot.

The input received from the application developer device 160 can include information that facilitates digital component selection in real-time. The input can include content selection criteria (e.g., keywords, topics, concepts, or matching techniques such as broad, phrase or exact match). The input can include metadata used to select digital components. The input can include constraints, such as types of digital components to exclude from selection and presentation via the application. For example, the input can include a maximum duration for an audio-only digital component (e.g., 15 seconds, 20 seconds, 30 seconds, 45 seconds, 60 seconds, or some other duration). By limiting the maximum allowed duration, the template can be constructed so as to reduce resource utilization (e.g., network bandwidth utilization and computing device 140 battery utilization).

Thus, the template management component 114 can select the application template comprising a slot for presenting the digital component provided by a third-party digital component provider, and receive input from the application developer computing device 160 that facilitates generating the slot or real-time selection of a digital component for the slot. The input can include selection criteria used to select, via a real-time content selection process, the digital component for presentation via the slot, a maximum time duration for the slot, an indication from the application developer computing device to establish the slot the digital component as an audio-only slot, or an indication from the application developer computing device to configure the slot as a cross-device slot in which the digital component is provided on a second computing device different from a first computing device presenting the voice-based software application. The template management component 114 can either select the template based on the input, or update or construct the template based on the input from the application developer computing device 160. The template management component 114 can customize the template with the slot based on the input received from the application developer computing device 160.

A cross-device slot can refer to a digital component slot in an application executing in a first client computing device 140 that triggers a request for a digital component to be presented via a second client computing device 140 different from the first client computing device 140 that triggered the request. Responsive to receiving the request from the first client computing device 140, the data processing system 102 executes, via the content selector component 126, a real-time digital component selection process to select a digital component. However, rather than provide the selected digital component for presentation on the first client computing device 140 that triggered the request, the data processing system 102 can identify a second client computing device 140. The data processing system 102 can perform a lookup to identify one or more client computing device 140 that are linked to the first client computing device 140 that generated the request. The client computing devices 140 can be linked to the same account, for example. The same account credentials can be input on multiple client computing devices 140. Examples of linked client computing devices 140 can include a smartphone, smartwatch, smart television, smart speaker, laptop computer, or tablet computing device. The data processing system 102 can receive the request from an application executing on a smartphone, but provide the digital component for presentation via a tablet computer that is logged into the same account as the smartphone.

The data processing system 102 can use various techniques to identify the second device, including performing a lookup in the account to identify linked devices, and determining linked devices that are proximate to the first device and/or being actively used. If the data processing system 102 determines the slot is a cross-device slot and a second client computing device 140 is proximate to the first client computing device and is being actively used (e.g., powered on or not in standby mode, capable of receiving data and presenting data), the data processing system 102 can transmit the selected digital component to the second client computing device and instruct the second client computing device to present the digital component. For example, the data processing system 102 can receive the request from a smartphone, and then transmit the digital component to a smart speaker to cause the smart speaker to play the digital component via audio-only output.

The template management component 114 or the request management component 112 can provide the selected template to the application developer device 160. The selected template can include a slot for a digital component. The template management component 114 can provide the selected template 122 to the application developer device 160 in a manner that causes the a representation of the template 122 to be displayed on an electronic display of the application developer device 160. For example, the template management component 114 can provide information corresponding to the selected template 122 in a format that allows the template 122 to be displayed within a graphical user interface of a web browser executed by or otherwise displayed on the application developer device 160. The template management component 114 can also provide a dedicated software development application to the application developer device 160. For example, the software development application can include a standalone application for a user of the application developer device 160 to provide information (e.g., the request to build the application, inputs relating to a template 122, etc.) to the data processing system 102. The template management component 114 can then provide the selected template 122 in a format that allows the template 122 to be displayed within a graphical user interface of the software development application on the application developer device 160.

The data processing system 102 can include, interface with, or otherwise access an application generation component 116. The application generation component 116 can build or generate an application based in part on information received from the application developer device 160. The application generation component 116 can build or generation the application based on the template. For example, the application generation component 116 can generate computer code corresponding to the application, and can compile the code to build or generate the application. The generated application can include a digital component slot configured based on input from the application developer device 160. The computer code can include standardized or reusable code that may correspond to standardized features of one or more modules (or slots) included in one or more templates provided to the application developer device 160. The computer code can also include customized code corresponding to the inputs received from the application developer device 160.

The application generation component 116 can use the application data 120 to generate the application. For example, at least some of the application data 120 can correspond to the standardized or reusable code for each module of each template 122. The application generation component 116 can receive, from the application developer device 160, a populated template 122. For example, inputs provided by the application developer device 160 can populate blank fields for one or more modules of a template 122 provided to the application developer device 160. The application generation component 116 can locate within the application data 120 the reusable code corresponding to the modules of the populated template 122, and can fill in blank portions of the code with code corresponding to the inputs provided by the application developer device 160. For example, the application generation component 116 can generate the application with a digital component slot constructed based on content selection criteria and parameters provided by the application developer device 160. The application generation component 116 can compile the code to generate the application. The application can be stored in the data repository 118. For example, the application can be a portion of the application data 120 in the data repository 118. The application delivery component 110 can deliver the application to the application developer device 160 or to the client computing device 140.

The application generation component 116 can also be configured to update the application after it has been generated. The application generation component 116 can update the application in an automated fashion. For example, the application generation component 116 can update the application without receiving any additional input from the application developer device 160. The application generation component 116 can update the application based on an update to the functionality of one or more modules of one or more templates 122 used to generate the application. A module can be updated to change or upgrade functionality of the module. For example, with reference to FIG. 2, the video controls module 220 may be updated to include more, fewer, or additional buttons or other controls. The video display module 215 can be updated to change a size or a resolution of its associated video display area. Generally, any module may be changed, modified, upgraded, or otherwise altered in a way that results in a change to its underlying computer code. The application generation component 116 can detect changes to modules or templates 122, and can automatically update any application that includes or is based on those modules or templates 122. For example, responsive to detecting a change to a module that was used to build an application, the application generation component 116 can regenerate the application using the new computer code that corresponds to the changed or updated module. The application generation component 116 can use the same inputs previously provided by the application developer device 160 when updating the application. As a result, the updated application may include customizable portions that are the same as or similar to the customizable portions of the original application. The application generation component 116 can store the updated application in the data repository 118. The application generation component 116 can automatically provide the updated application to either or both of the application developer device 160 and the client computing device 140.

The data processing system 102 can include, execute, or otherwise communicate with a content selector component 126 to receive the queries, keywords or trigger keywords identified by the natural language processor and select, based on a keyword, a digital component. The content selector component 126 can select the digital component responsive to receiving a request for a digital component for presentation in a digital component slot presented via an application generated by the data processing system 102 and executing on the client computing device 140. The content selector component 126 can select the digital component via a real-time content selection process. The content selection process can include, for example, performing a search via a search engine, or accessing a database stored on a remote server or device such as a third-party device 162. The content selection process can refer to, or include, selecting sponsored digital component objects provided by third-party devices 162 (e.g., a content provider). The real-time content selection process can include a service in which digital components provided by multiple content providers are parsed, processed, weighted, or matched in order to select one or more digital components to provide to the computing device 140. The content selector component 126 can perform the content selection process in real-time. Performing the content selection process in real-time can refer to performing the content selection process responsive to the request for content received via the client computing device 140. The real-time content selection process can be performed (e.g., initiated or completed) within a time interval of receiving the request (e.g., 1 second, 2 seconds, 5 seconds, 10 seconds, 20 seconds, 30 seconds, 1 minute, 2 minutes, 3 minutes, 5 minutes, 10 minutes, or 20 minutes). The real-time content selection process can be performed during a communication session with the client computing device 140, or within a time interval after the communication session is terminated. The data processing system 102 can select an audio chime to provide subsequent to completion of the digital component selection process or other digital task.

For example, the data processing system 102 can include a content selector component 126 designed, constructed, configured or operational to select digital component objects. The content selector component 126 can select digital components based on metadata or content selection criteria provided by the application developer device 160 as input used to generate the application. The content selector component 126 can select digital components based on information provided by the third-party device 162 to establish a content campaign. The content selector component 126 can select digital components based on voice input detected by a microphone of the client computing device 140. The content selector component 126 can select digital components based on main content provided by the application, such as content in a text display area 225, content in a video display area 215, title 205, or subtitle 210 as depicted in FIG. 2.

For example, to select digital components for presentation in a voice-based environment, the data processing system 102 (e.g., via an NLP component 106) can receive voice input as an input audio signal. The input audio signal can be detected by a microphone. The application can process the input audio signal to perform a task or function associated with the application. In some cases, the application can provide the input audio signal to the data processing system along with a request for a digital component. The data processing system 102 can receive the input audio signal. The data processing system 102 can receive a request for a digital component. The data processing system 102 can receive additional information associated with the slot for the digital component. The data processing system 102 can parse the input audio signal to identify queries, keywords (e.g., a trigger keyword), and use the keywords to select a matching digital component. The data processing system 102 can select the digital component based on input provided by the application developer device 160 when establishing the template with the slot used to generate the application. The data processing system 102 can select the matching digital component based on a broad match, exact match, or phrase match. For example, the content selector component 126 can analyze, parse, or otherwise process subject matter of candidate digital components to determine whether the subject matter of the candidate digital components correspond to the subject matter of the keywords or phrases associated with input provided by the application developer device 160 or other content of the application of the input audio signal detected by the microphone of the client computing device 140. The content selector component 126 may identify, analyze, or recognize voice, audio, terms, characters, text, symbols, or images of the candidate digital components using an image processing technique, character recognition technique, natural language processing technique, or database lookup. The candidate digital components may include metadata indicative of the subject matter of the candidate digital components, in which case the content selector component 126 may process the metadata to determine whether the subject matter of the candidate digital component corresponds to the input audio signal.

Third-party devices 162 may provide additional indicators when setting up a content campaign that includes digital components. The content provider may provide information at the content campaign or content group level that the content selector component 126 may identify by performing a lookup using information about the candidate digital component. For example, the candidate digital component may include a unique identifier, which may map to a content group, content campaign, or content provider. The content selector component 126 may determine information about the third-party device 162.

The data processing system 102 can receive, via network 105, a request for content for presentation on a client computing device 140. The request can be provided by the application executing on the client computing device 140. The application can generate and transmit the request responsive to a script, command, or function embedded in the digital component slot provided by the template used to generate the application. The data processing system 102 can identify the request by processing an input audio signal detected by a microphone of the client computing device 140. The data processing system 102 can identify information associated with the request, such as selection criteria of the request, such as the device type, location, and a keyword associated with the request.

Responsive to the request, the data processing system 102 can select a digital component object from a data repository or a database that can include content provided by one or more third-party devices 162, and provide the digital component for presentation via the client computing device 140 via network 105. The client computing device 140 can interact with the digital component object. The client computing device 140 can receive an audio response to the digital component. The client computing device 140 can receive an indication to select a hyperlink or other button associated with the digital component object that causes or allows the client computing device 140. For example, the link can direct the client computing device 140 to a digital resource of the third-party device 162, content provider, or service provider to perform a service.

Figure 3:
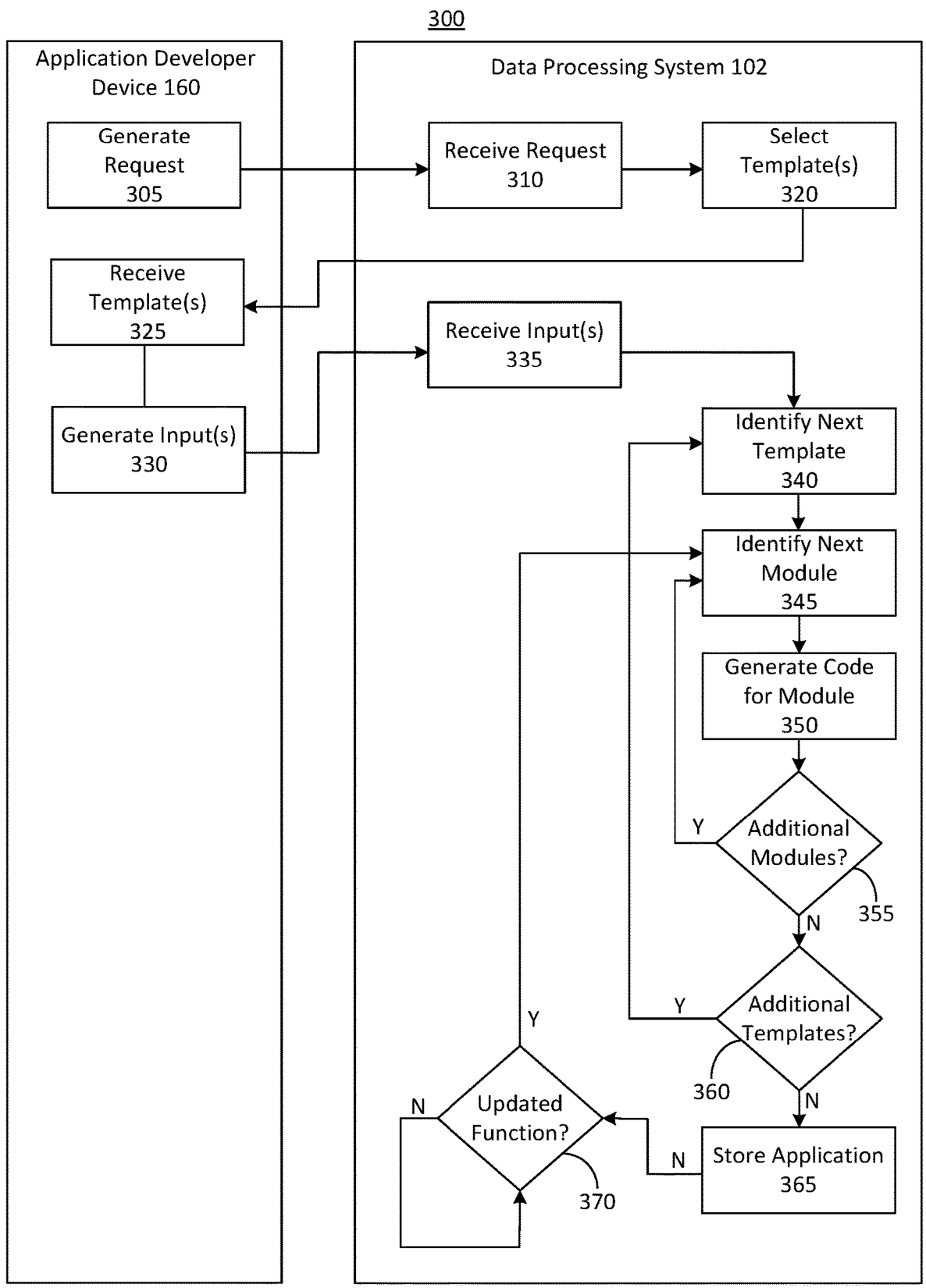
FIG. 3 is an illustration of an example operation of a system to generate voice-based software applications.

FIG. 3 is an illustration of the operation of a system 300 to generate voice-based software applications. The system 300 can include one or more component of system 100 depicted in FIG. 1 or system 500 depicted in FIG. 5. The system 300 can include a data processing system 102. The data processing system 102 can communicate, interface with, or otherwise interact with an application developer device 160.

At ACT 305, the application developer device 160 can generate a request. The request can be a request for the data processing system 102 to build a voice-based software application. The request can include information related to the application. For example, the request can include an intent. The intent may correspond to one or more desired features of the application to be built. The request can also identify one or more types of the application. The type of the application can correspond to a category to which the application belongs (e.g., a video streaming application, a weather forecast application, a map application, a social media application, a ridesharing service application, a game application, etc.). The application developer device 160 can transmit the request to the data processing system 102.

At ACT 310, the data processing system 102 can receive the request from the application developer device 160. The request can be received, for example, by the request management component 112 shown in FIG. 1. The data processing system 102 can process the request to determine or extract an intent or a type of application from the request. At ACT 320, the data processing system 102 can select one or more templates 122 to be provided to the application developer device 160. The templates 122 can be selected by the template management component 114 shown in FIG. 1. The templates 122 can assist the application developer device 160 with providing additional information to allow the data processing system 102 to build the application. The data processing system 102 can select the templates 122 based on the request. For example, the data processing system 102 can select the templates 122 based on the intent or the type of the application that was extracted or determined from the request received at ACT 310. The data processing system 102 can use one or more policies, such as the policies 124 shown in FIG. 1, to select the one or more templates 122. For example, a policy 124 may be any set of rules or heuristics for selecting one or more templates 122 based on a characteristic of the request received from the application developer device 160, such as an intent or a type of the application. The data processing system 102 can provide the selected one or more templates 122 to the application developer device 160.

At ACT 325, the application developer device 160 can receive the selected templates 122 from the data processing system 102. The application developer device 160 can be configured to display a representation of the templates 122. For example, the application developer device 160 can display the templates 122 within a web-based graphical user interface. The application developer device 160 can also display the templates 122 within a graphical user interface of a dedicated software development application. At ACT 330, the application developer device 160 can generate one or more inputs. The inputs can correspond to blank fields of modules included in the templates 122. For example, each template 122 can include at least one module. At least some of the modules may include blank or unpopulated fields corresponding to information or features that can be customized by the application developer device 160. The blank fields can be populated by the application developer device 160, for example to specify text to be displayed in connection with one or more modules, video content to be displayed in connection with one or more modules, image content to be displayed in connection with one or more modules, user interface elements (e.g, selectable buttons) to be displayed in connection with one or more modules, etc. The application developer device 160 can provide the inputs to the data processing system 102.

At ACT 335, the data processing system 102 can receive the inputs from the application developer device 160. The data processing system 102 can also receive an indication of the templates or modules to which the inputs correspond. The data processing system 102 can then perform Acts 340-360 to generate the application based on the inputs. For example, at ACT 340, the data processing system 102 can identify a next template. In some examples, multiple templates 122 can be used to generate the application. For example, the data processing system 102 can select multiple templates 122 at ACT 320, and the application developer device 160 can generate inputs for the multiple templates 122 at ACT 330. The application can be built one template at a time. Thus, the data processing system 102 can identify a next template 122 at ACT 340.

At ACT 345, the data processing system 102 can identify a next module of the current template 122. For the identified module, the data processing system 102 can generate the corresponding computer code at ACT 350. The module may correspond to a voice-based or voice-activated feature or functionality of the application. At least some of the computer code can be selected, identified, or generated as reusable or standardized code corresponding to the selected module. For example, standardized or reusable code for a module can be stored in a memory element such as the data repository 118 shown in FIG. 1. The data processing system 102 can identify the standardized or reusable code corresponding to the current module. The data processing system 102 can also generate computer code corresponding to any of the inputs provided by the application developer device 160 for the current module. For example, the data processing system 102 can use the inputs to fill in blank or unpopulated portions of the standardized code for the current module. Together, the standardized code and the code generated based on the inputs provided by the application developer device 160 can constitute the code for the current module. The code for the current module can be compiled to provide a feature corresponding to the current module in the application. For example, the module may correspond to a voice-based or voice-activated feature or functionality of the application. In some cases, the module can correspond to a digital component slot configured to present digital components selected by a real-time digital component selection process.

At ACT 355, the data processing system 102 can determine whether there are additional modules for the current template 122. For example, the template 122 may include more than one module. The data processing system 102 can generate the code for each module in series. Thus, if there are additional modules for the current template 122, the data processing system 102 can perform ACT 345 and 350 repeatedly until the data processing system 102 has generated code corresponding to each module of the current template 122. When the code for all of the modules of the current template 122 has been generated, the data processing system 102 can determine whether there are additional templates 122 for the application at ACT 360. If there are additional templates 122, the data processing system 102 can return to ACT 340 to identify the next template 122, and can repeat ACTS 340, 345, 350, 355, and 360 until all of the data processing system 102 has generated the code for all of the modules of all of the templates 122. The data processing system 102 can compile the code to build the application and can store the application at ACT 365. For example, the data processing system 102 can store the application in the data repository 118.

At ACT 370, the data processing system 102 can detect whether a function of the application has been updated. For example, a function of the application can be updated when a module of any of the templates 122 used to create the application is updated. An update to a module can include any change to a module, for example to improve or otherwise alter a corresponding function or feature. If no change to a function is detected, the data processing system 102 can simply continue to check for changes. When an updated function is detected, the data processing system 102 can return to ACT 345 to identify the module that corresponds to the updated function. Then, the data processing system 102 can regenerate the code for the updated module at ACT 350. The data processing system 102 can perform checks to see whether there are additional updated modules or templates at ACTS 355 and 360, until all of the updated code is generated. The data processing system 102 can then store the updated application at ACT 365. Thus, the data processing system 102 can automatically update the application on a periodic or continuous basis, without receiving any additional inputs from the application developer device 160.

Figure 4:
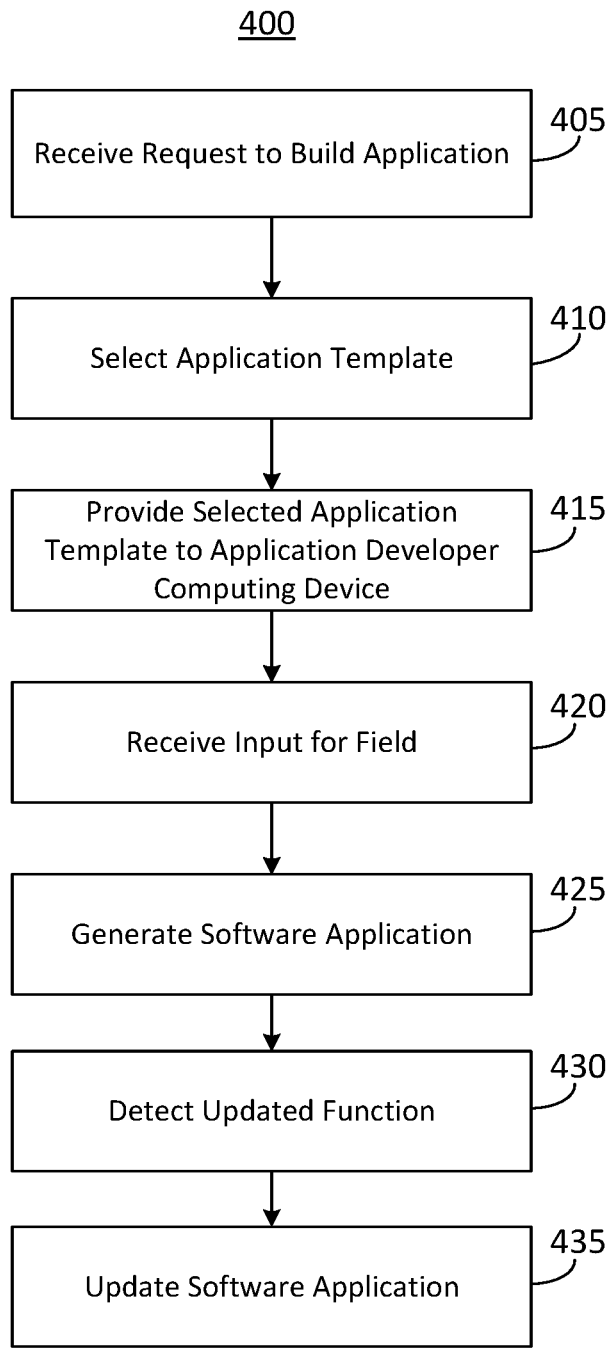
FIG. 4 is an illustration of an example method of generating voice-based software applications.

FIG. 4 is an illustration of an example method 400 of generating voice-based software applications. The method 400 can be performed by one or more component, system or element of system 100 depicted in FIG. 1, system 300 depicted in FIG. 3, or system 500 depicted in FIG. 5. For example, the method 400 can be performed by a data processing system such as the data processing system 102 shown in FIG. 1. At ACT 405, the data processing system 102 can receive a request to build an application. The application can be a voice-based software application. The data processing system 102 can receive the request from the application developer device 160 shown in FIG. 1. The request can include information related to the application. For example, the request can include an intent. The intent may correspond to one or more desired features of the application to be built. The request can also identify one or more types of the application. A type of the application can correspond to a category to which the application belongs. The request can be received, for example, by the request management component 112 shown in FIG. 1.

At ACT 410, the data processing system 102 can select one or more application templates such as the templates 122 shown in FIG. 1. The data processing system 102 can process the request to determine or extract an intent or a type of application from the request. The data processing system 102 can select the one or more templates 122 to assist the application developer device 160 with providing additional information to allow the data processing system 102 to build the application. The data processing system 102 can select the templates 122 based on the request. For example, the data processing system 102 can select the templates 122 based on the intent or the type of the application that was extracted or determined from the request received at ACT 405. The data processing system 102 can use one or more policies, such as the policies 124 shown in FIG. 1, to select the one or more templates 122. For example, a policy 124 may be any set of rules or heuristics for selecting one or more templates 122 based on a characteristic of the request received from the application developer device 160, such as an intent or a type of the application.

At ACT 415, the data processing system 102 can provide the selected one or more templates 122 to the application developer device 160. The templates 122 can be provided to the application developer device 160 in a manner that causes the templates 122 to be displayed on the application developer device 160. For example, the templates 122 can be displayed within a graphical user interface on the application developer device 160. The graphical user interface can be a web-based graphical user interface. The graphical user interface can be an interface of a software development application executed on or otherwise accessed by the application developer device 160. The templates 122 can be displayed along with blank fields or other indications of unpopulated portions of the templates 122 that can be populated using the application developer device 160. For example, the application developer device 160 can enter one or more inputs for each blank field of each template 122 to customize functionality associated with the field.

At ACT 420, the data processing system 102 can receive the inputs for each field. The data processing system 102 can receive the inputs from the application developer device 160. The data processing system 102 can also receive an indication of the modules and blank fields to which the inputs correspond. For example, if the module is a digital component slot, the data processing system 102 can receive input such as selection criteria, a maximum time duration for content present via the slot, a format requirement for content presented via the slot (e.g., audio-only, video, text, or image), or a cross-device content slot.

At ACT 425, the data processing system 102 can generate the software application. The data processing system 102 can generate the software application based on the templates 122 and the inputs provided by the application developer device 160. The data processing system 102 can generate the application by successively generating code for each module of each template 122. For example, there may be more than one template 122 and more than one module per template 122 for the application. For a given template 122, the data processing system 102 can select a first module and can generate the computer code for that module. Some of the code for a module can be standardized or reusable code. For example, the standardized or reusable code can be stored in a memory element such as the data repository 118 shown in FIG. 1. The data processing system 102 can identify the reusable code corresponding to the module and can retrieve the code from the data repository 118. The data processing system 102 can also generate computer code corresponding to any of the inputs provided by the application developer device 160 for the current module. For example, the data processing system 102 can use the inputs to fill in blank or unpopulated portions of the standardized code of a module. Together, the standardized code and the code generated based on the inputs provided by the application developer device 160 can constitute the code for the module. The module may correspond to a voice-based or voice-activated feature or functionality of the application. The data processing system 102 can also repeat this process for other modules of a given template, and for the modules of any additional templates 122 as well, in order to generate the code for the entire application.

At ACT 430, the data processing system 102 can detect an update to a function. The updated function can correspond to the at least one module of a template 122 used to build the application. For example, a function of the application can be updated when a module of any of the templates 122 used to create the application is updated. An update to a module can include any change to a module, for example to improve or otherwise alter the corresponding function or feature. The data processing system 102 can identify the module that corresponds to the updated function. At ACT 435, the data processing system 102 can update the application to generate an updated application. The data processing system 102 can regenerate the code for the updated module. For example, the data processing system 102 can generate the code by repeating ACT 425 for the updated module. The data processing system 102 can update the code for any module whose corresponding function has been updated. Updating the code for at least one module can produce the updated application. The data processing system 102 can then store the updated application, for example in the data repository 118. Thus, the data processing system 102 can automatically update the application without any additional input or action from the application developer device 160. As a result, the data processing system 102 can allow the software application to be developed efficiently and updated automatically.

Figure 5:
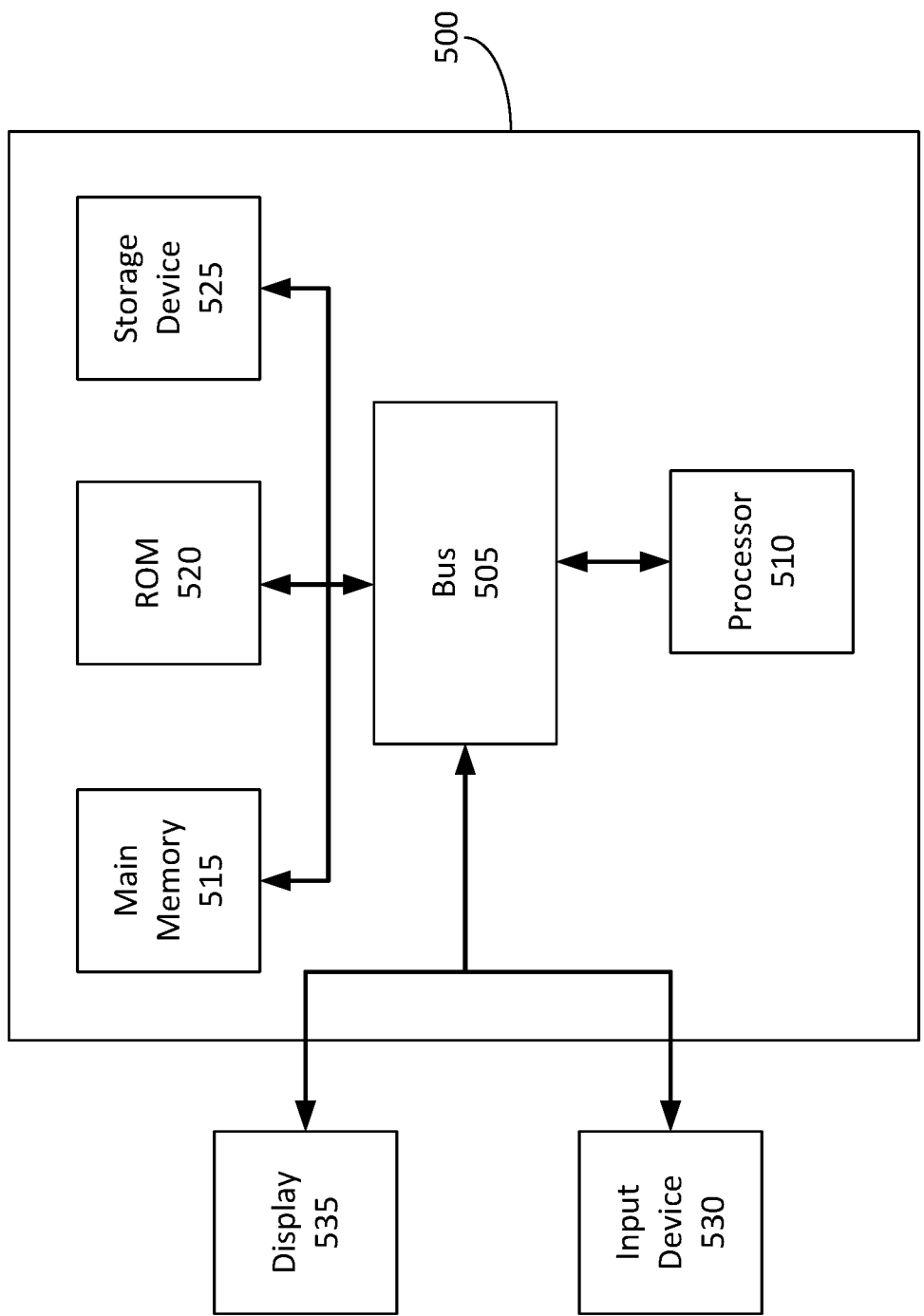
FIG. 5 is a block diagram illustrating a general architecture for a computer system that can be employed to implement elements of the systems and methods described and illustrated herein, including, for example, the systems depicted in FIGS. 1 and 3, the application template depicted in FIG. 2, and the method depicted in FIG. 4.

FIG. 5 is a block diagram of an example computer system 500. The computer system 500 can also be referred to as a computing device 500. The computer system 500 can include or be used to implement the system 100, or its components such as the data processing system 102. The data processing system 102 can include an intelligent personal assistant or voice-based digital assistant. The computer system 500 includes a bus 505 or other communication component for communicating information and a processor 510 or processing circuit coupled to the bus 505 for processing information. The computer system 500 can also include one or more processors 510 or processing circuits coupled to the bus for processing information. The computer system 500 also includes main memory 515, such as a random access memory (RAM) or other dynamic storage device, coupled to the bus 505 for storing information, and instructions to be executed by the processor 510. The main memory 515 can be or include the data repository 118. The main memory 515 can also be used for storing position information, temporary variables, or other intermediate information during execution of instructions by the processor 510. The computer system 500 may further include a read only memory (ROM) 520 or other static storage device coupled to the bus 505 for storing static information and instructions for the processor 510. A storage device 525, such as a solid state device, magnetic disk or optical disk, can be coupled to the bus 505 to persistently store information and instructions. The storage device 525 can include or be part of the data repository 118.

The computer system 500 may be coupled via the bus 505 to a display 535, such as a liquid crystal display, or active matrix display, for displaying information to a user. An input device 530, such as a keyboard including alphanumeric and other keys, may be coupled to the bus 505 for communicating information and command selections to the processor 510. The input device 530 can include a touch screen display 535. The input device 530 can also include a cursor control, such as a mouse, a trackball, or cursor direction keys, for communicating direction information and command selections to the processor 510 and for controlling cursor movement on the display 535. The display 535 can be part of the data processing system 102, the client computing device 140 or other component of FIG. 1, for example.

The processes, systems and methods described herein can be implemented by the computer system 500 in response to the processor 510 executing an arrangement of instructions contained in main memory 515. Such instructions can be read into main memory 515 from another computer-readable medium, such as the storage device 525. Execution of the arrangement of instructions contained in main memory 515 causes the computer system 500 to perform the illustrative processes described herein. One or more processors in a multi-processing arrangement may also be employed to execute the instructions contained in main memory 515. Hard-wired circuitry can be used in place of or in combination with software instructions together with the systems and methods described herein. Systems and methods described herein are not limited to any specific combination of hardware circuitry and software.

Although an example computing system has been described in FIG. 5, the subject matter including the operations described in this specification can be implemented in other types of digital electronic circuitry, or in computer software, firmware, or hardware, including the structures disclosed in this specification and their structural equivalents, or in combinations of one or more of them.

For situations in which the systems discussed herein collect personal information about users, or may make use of personal information, the users may be provided with an opportunity to control whether programs or features that may collect personal information (e.g., information about a user's social network, social actions or activities, a user's preferences, or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "data processing system" "computing device" "component" or "data processing apparatus" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. For example, the direct action API 108 or NLP component 106 and other data processing system 102 components can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 102) to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

A computer system such as system 100 or system 500 can include clients and servers. A client and server are generally remote from each other and typically interact through a communication network (e.g., the network 105). The relationship of client and server arises by virtue of computer programs running on the respective computers and having a client-server relationship to each other. In some implementations, a server transmits data (e.g., data packets representing a digital component) to a client device (e.g., for purposes of displaying data to and receiving user input from a user interacting with the client device). Data generated at the client device (e.g., a result of the user interaction) can be received from the client device at the server (e.g., received by the data processing system 102 from the client computing device 140 or the application developer device 160 or the third-party device 162).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the NLP component 106 or the direct action API 108, can be a single component, app, or program, or a logic device having one or more processing circuits, or part of one or more servers of the data processing system 102.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A system to generate voice-based software applications, comprising:
   a data processing system comprising at least one processor and memory to:
   receive, from an application developer computing device, a request to build a voice-based software application;
   parse the request to determine an intent;
   identify a plurality of modules associated with the intent; and
   select an application template from a plurality of application templates based on an overlap between the identified plurality of modules associated with the intent and at least one module of the selected application template, the at least one module corresponding to a function of the voice-based software application and having at least one field;
   provide the selected application template to the application developer computing device;
   receive, from the application developer computing device, an input for the at least one field; and
   generate the voice-based software application based on the selected application template and the input for the at least one field.

2. The system of claim 1, comprising the data processing system to:
   select the application template based on a policy that includes a mapping of the intent with a respective application template.

3. The system of claim 1, comprising the data processing system to:
   parse the request to determine a type of the voice-based software application; and
   select the application template based on the type.

4. The system of claim 1, comprising the data processing system to:
   select the application template comprising a slot for presenting a digital component provided by a third-party digital component provider; and
   receive second input from the application developer computing device comprising selection criteria used to select, via a real-time content selection process, the digital component for presentation via the slot.

5. The system of claim 1, comprising the data processing system to:
   select the application template comprising a slot for presenting a digital component provided by a third-party digital component provider;
   receive, from the application developer computing device, a maximum time duration for the slot; and
   generate the voice-based software application with the slot for the digital component with the maximum time duration.

6. The system of claim 1, comprising:
   select the application template comprising a slot for presenting a digital component provided by a third-party digital component provider;
   receive an indication from the application developer computing device to establish the slot of the digital component as an audio-only slot; and
   generate the voice-based software application with the audio-only slot.

7. The system of claim 1, comprising the data processing system to:
- select the application template comprising a slot for presenting a digital component provided by a third-party digital component provider;
- receive an indication from the application developer computing device to configure the slot as a cross-device slot in which the digital component is provided on a second computing device different from a first computing device presenting the voice-based software application; and
- generate the voice-based software application with the cross-device slot.

8. The system of claim 1, comprising the data processing system to:
- provide, to the application developer computing device, a list of a plurality of application types to cause the list to be displayed on the application developer computing device;
- receive, from the application developer computing device, a selection of a first type of the plurality of application types; and
- select the application template based on the first type of the plurality of application types.

9. The system of claim 1, comprising the data processing system to:
- receive the request indicating that the voice-based software application includes a video function; and
- select the application template to include a video module to support the video function, the video module corresponding to at least one of a pause function, a play function, a rewind function, and a forward function.

10. The system of claim 1, comprising the data processing system to:
- provide, to the application developer computing device, a web-based graphical user interface within which the selected application template is displayed.

11. A method of generating voice-based software applications, comprising:
- receiving, by a data processing system comprising at least one processor and memory, from an application developer computing device, a request to build a voice-based software application;
- parsing the request to determine an intent;
- identifying a plurality of modules associated with the intent; and
- selecting an application template from a plurality of application templates based on an overlap between the identified plurality of modules associated with the intent and at least one module of the selected application template, the at least one module corresponding to a function of the voice-based software application and having at least one field;
- providing the selected application template to the application developer computing device;
- receiving, from the application developer computing device, an input for the at least one field; and
- generating the voice-based software application based on the selected application template and the input for the at least one field.

12. The method of claim 11, comprising:
- parsing, by the data processing system, the request to determine a type of the voice-based software application; and
- selecting, by the data processing system, the application template based on the type.

13. The method of claim 11, comprising:
- selecting the application template comprising a slot for presenting a digital component provided by a third-party digital component provider; and
- receiving second input from the application developer computing device comprising selection criteria used to select, via a real-time content selection process, the digital component for presentation via the slot.

14. The method of claim 11, comprising:
- selecting the application template comprising a slot for presenting a digital component provided by a third-party digital component provider;
- receiving, from the application developer computing device, a maximum time duration for the slot; and
- generating the voice-based software application with the slot for the digital component with the maximum time duration.

15. The method of claim 11, comprising:
- selecting the application template comprising a slot for presenting a digital component provided by a third-party digital component provider;
- receiving an indication from the application developer computing device to establish the slot of the digital component as an audio-only slot; and
- generating the voice-based software application with the audio-only slot.

16. The method of claim 11, comprising:
- selecting the application template comprising a slot for presenting a digital component provided by a third-party digital component provider;
- receiving an indication from the application developer computing device to configure the slot as a cross-device slot in which the digital component is provided on a second computing device different from a first computing device presenting the voice-based software application; and
- generating the voice-based software application with the cross-device slot.

17. The method of claim 11, comprising:
- providing, to the application developer computing device, a list of a plurality of application types to cause the list to be displayed on the application developer computing device;
- receiving, from the application developer computing device, a selection of a first type of the plurality of application types; and
- selecting the application template based on the first type of the plurality of application types.

18. The method of claim 11, comprising:
- receiving the request indicating that the voice-based software application includes a video function; and
- selecting the application template to include a video module to support the video function, the video module corresponding to at least one of a pause function, a play function, a rewind function, and a forward function.

19. The method of claim 11, comprising:
- providing, to the application developer computing device, a web-based graphical user interface within which the selected application template is displayed.

20. The method of claim 11, comprising:
- select the application template based on a policy that includes a mapping of the intent with a respective application template.

* * * * *